US012649960B2

(12) United States Patent
Nishikawa et al.

(10) Patent No.: US 12,649,960 B2
(45) Date of Patent: Jun. 9, 2026

(54) METHOD FOR RECOVERING VALUABLE SUBSTANCE

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Ryoei Watanabe, Tokyo (JP); Masataka Yamashita, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 807 days.

(21) Appl. No.: 17/909,898

(22) PCT Filed: Mar. 9, 2021

(86) PCT No.: PCT/JP2021/009222
§ 371 (c)(1),
(2) Date: Sep. 7, 2022

(87) PCT Pub. No.: WO2021/182451
PCT Pub. Date: Sep. 16, 2021

(65) Prior Publication Data
US 2023/0107938 A1 Apr. 6, 2023

(30) Foreign Application Priority Data

Mar. 13, 2020 (JP) ................................. 2020-043890
Mar. 8, 2021 (JP) ................................. 2021-035991

(51) Int. Cl.
*C22B 26/12* (2006.01)
*B09B 3/35* (2022.01)
(Continued)

(52) U.S. Cl.
CPC ................ *C22B 26/12* (2013.01); *B09B 3/35* (2022.01); *B09B 3/70* (2022.01); *C22B 1/005* (2013.01);
(Continued)

(58) Field of Classification Search
CPC ..................................................... C22B 26/12
See application file for complete search history.

(56) References Cited

U.S. PATENT DOCUMENTS 5,378,262 A 1/1995 Mihaylov et al.
2013/0121899 A1 5/2013 Chon et al.
(Continued)

FOREIGN PATENT DOCUMENTS

EP 4 140 952 A1 3/2023
IT VI20 100 232 A1 2/2012
(Continued)

OTHER PUBLICATIONS

Office Action that issued in corresponding Taiwanese Application No. 110108725, dated Jul. 11, 2024, along with English translation.
(Continued)

*Primary Examiner* — Christopher S Kessler
(74) *Attorney, Agent, or Firm* — Greenblum & Bernstein, P.L.C.

(57) ABSTRACT

A method for recovering valuable substance, for recovering it from lithium ion secondary battery includes: thermal treatment step of thermally treating lithium ion secondary battery to obtain thermally treated product; pulverizing/classifying step of classifying pulverized product obtained by pulverizing thermally treated product, to obtain coarse and fine-grained products both containing valuable substance; water leaching step of immersing fine-grained product in water, to obtain water-leached slurry; wet magnetic sorting step of subjecting water-leached slurry to wet mag-
(Continued)

netic sorting, to sort water-leached slurry into magnetically attractable materials and non-magnetically attractable material slurry; and acid leaching step of adding acidic solution to either or both of non-magnetically attractable material slurry recovered by wet magnetic sorting and non-magnetically attractable materials obtained by solid-liquid separation of non-magnetically attractable material slurry to leach non-magnetically attractable materials at pH lower than 4, followed by solid-liquid separation to obtain acid leaching liquid and acid leaching residue.

19 Claims, 2 Drawing Sheets

(51) Int. Cl.

| | |
|---|---|
| B09B 3/70 | (2022.01) |
| C22B 1/00 | (2006.01) |
| C22B 3/08 | (2006.01) |
| C22B 7/00 | (2006.01) |
| H01M 10/54 | (2006.01) |

(52) U.S. Cl.
CPC .............. C22B 3/08 (2013.01); C22B 7/005 (2013.01); H01M 10/54 (2013.01)

(56) References Cited

U.S. PATENT DOCUMENTS

| | | | |
|---|---|---|---|
| 2020/0078796 A1* | 3/2020 | Kochhar | C22B 26/12 |
| 2020/0248283 A1 | 8/2020 | Ariyoshi et al. | |
| 2021/0108286 A1 | 4/2021 | Arakawa et al. | |
| 2021/0210807 A1* | 7/2021 | Nishikawa | B02C 19/186 |
| 2022/0056276 A1* | 2/2022 | Oetzel | C01D 15/02 |
| 2023/0107938 A1 | 4/2023 | Nishikawa et al. | |
| 2023/0132311 A1 | 4/2023 | Ariyoshi et al. | |

FOREIGN PATENT DOCUMENTS

| | | |
|---|---|---|
| JP | 8-35023 A | 2/1996 |
| JP | 2009-270189 A | 11/2009 |
| JP | 2012-229481 A | 11/2012 |
| JP | 2017-4920 A | 1/2017 |
| JP | 2017-37807 A | 2/2017 |
| JP | 2017-115179 A | 6/2017 |
| JP | 2018-145473 A | 9/2018 |
| JP | 2018-172732 A | 11/2018 |
| JP | 2019-26916 A | 2/2019 |
| JP | 2019-160429 A | 9/2019 |
| JP | 2021-147706 A | 9/2021 |
| JP | 6948481 B2 | 10/2021 |
| JP | 2021-172537 A | 11/2021 |
| KR | 10-2012-0005981 A | 1/2012 |
| KR | 10-2018-0046636 A | 5/2018 |
| TW | 201822401 A | 6/2018 |
| WO | 2020/011765 A1 | 1/2020 |

OTHER PUBLICATIONS

Office Action issued in corresponding Japanese Patent Application No. 2022-204158 dated Apr. 4, 2023.
International Search Report and Written Opinion of the International Searching Authority issued in International Patent Application No. PCT/JP2021/009222, dated May 25, 2021, along with an English translation thereof.
Notice of Reasons for Refusal (Office Action) issued in Japanese Counterpart Patent Appl. No. 2021-035991, dated May 25, 2021, along with an English translation thereof.
Extended European Search Report that issued in corresponding European Patent Application No. 21768016.4, dated Mar. 20, 2024.
Li et al., "Environmentally-friendly oxygen-free roasting/wet magnetic separation technology for in situ recycling cobalt, lithium carbonate and graphite from spent LiCoO₂/graphite lithium batteries", Journal of Hazardous Materials, vol. 302, 2015, pp. 97-104.
Wang et al., "Recovery of cobalt from spent lithium ion batteries using sulphuric acid leaching followed by solid-liquid separation and solvent extraction", RSC Advances, vol. 6, No. 88, 2016, pp. 85303-85311.
Gmar et al., "Recent advances on electrodialysis for the recovery of lithium from primary and secondary resources", Hyrometallurgy, vol. 189, 2019, pp. 1-12.
Extended European search report, dated Sep. 26, 2025, that issued in corresponding European Patent Application No. 23743192.9.
"Chelating resin—Wikipedia", Wikipedia, Apr. 2021, pp. 1-3, retrieved from the Internet: URL:https://en.wikipedia.org/w/index.php?title=Chelating_resin&oldid=1015611780.
Schmuckler et al.: "Chelating resins-their analytical properties and applications", Talanta, vol. 12, No. 3, Mar. 1965, pp. 281-290.
Korean Office Action, dated Aug. 6, 2025, that issued in corresponding Korean Patent Application No. 10-2022-7031917.
International Search Report that Issued in International Patent Application No. PCT/JP2023/000880, dated Apr. 4, 2023, along with an English translation thereof.

* cited by examiner

METHOD FOR RECOVERING VALUABLE SUBSTANCE

TECHNICAL FIELD

The present invention relates to a method for recovering a valuable substance from a lithium ion secondary battery.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable substances such as cobalt and nickel are used in the positive electrodes of lithium ion secondary batteries in the form of, for example, lithium cobaltate (LiCoO$_2$) and a ternary system positive electrode material (LiNi$_x$Co$_y$Mn$_z$O$_2$ (x+y+z=1)).

Lithium ion secondary batteries are expected to continue to become more widespread in use. Therefore, in terms of resource recycling, it is desirable to recover valuable substances such as lithium from defective products generated in the production process or from lithium ion secondary batteries discarded due to, for example, expired life of both the devices in which they are used and batteries. When recovering valuable substances such as lithium from lithium ion secondary batteries, it is important to recover the valuable substances by separating various metals or impurities used in the lithium ion secondary batteries from the valuable substances in order to increase the value of the recovered products.

Among the methods proposed as the methods for recovering lithium from lithium ion secondary batteries, there is a method for recovering lithium, the method being intended to recover lithium from a battery residue obtained by roasting a waste lithium ion secondary battery, the method including a leaching step of leaching the battery residue containing lithium aluminate into an acidic solution, and a neutralizing step of increasing pH of the post-leaching liquid obtained in the leaching step for neutralization and performing solid-liquid separation to obtain a lithium solution (for example, see PTL 1).

CITATION LIST

Patent Literature

PTL 1: Japanese Patent Application Laid-Open (JP-A) No. 2019-160429

SUMMARY OF INVENTION

Technical Problem

However, PTL 1 has a problem that it cannot commit to effective utilization of negative electrode active substance-derived carbon (C) contained in the lithium ion secondary battery, because the carbon that is contained in a residue obtained in the neutralizing step has mixed with other neutralization precipitates and it is impossible to obtain a high-grade carbon (C) concentrate.

Moreover, PTL 1 recovers cobalt (Co) and nickel (Ni) as neutralized products. Among the neutralized products that are recovered, there are also impurities such as aluminum, copper, and iron that have failed to be recovered as an oversize product in a sieving step, and neutralizer-derived impurities (for example, calcium sulfate). It is difficult to apply a simple or quick separation and recovery method such as selective acid leaching to recovering cobalt and nickel from among these neutralized products (which are in a form collectively soluble in the acid without selectivity between cobalt and nickel, and the other impurities such as aluminum). Moreover, costly and bothersome steps such as solvent extraction are necessary after the neutralization targets are leached into an acid. Therefore, not only are high recovery costs needed, but also many steps are needed to recover cobalt and nickel and recovery is very time-consuming. Furthermore, loss of cobalt and nickel occurs in each step.

When the leaching step, the neutralizing step, and the lithium recovering step of PTL 1 are employed, lithium fluoride or lithium sulfate precipitates from the lithium solution obtained in the neutralizing step, together with lithium carbonate recovered from the liquid solution. The fluorine grade in the precipitate is higher than 1%, and it is impossible to recover lithium carbonate (lithium carbonate having a marketable quality) having an industrial grade (i.e., a Li carbonate grade of 99.0% or higher).

It is possible to better suppress the fluorine concentration and the sulfuric acid concentration in the lithium solution by using slaked lime (Ca(OH)$_2$) in the neutralizing step than by using any other neutralizer (for example, sodium hydroxide). However, in this case, a large quantity of calcium ions are kept dissolved in the liquid at the requisite neutralization endpoint, which is pH of from 7 through 9. It has been confirmed that lithium carbonate having a high calcium concentration (which may be higher than, for example, 0.1%) is obtained when lithium carbonate is refined from this liquid.

The present invention aims for solving the various problems in the related art and achieving objects described below. That is, the present invention has an object to provide a method for recovering a valuable substance, the method being able to recover a high-grade carbon (C) concentrate from a lithium ion secondary battery and to also recover carbon, lithium carbonate, cobalt, and nickel from a lithium ion secondary battery at low costs and easily (through a small number of steps in a short time) at high recovery rates. The present invention also has an object to provide a method for recovering a valuable substance, the method being able to recover lithium carbonate having low fluorine, sulfuric acid, and calcium grades.

Solution to Problem

Means for solving the above problems are as follows.
<1> A method for recovering a valuable substance, for recovering a valuable substance from a lithium ion secondary battery the method including:
  a thermal treatment step of thermally treating a lithium ion secondary battery to obtain a thermally treated product;
  a pulverizing/classifying step of classifying a pulverized product that is obtained by pulverizing the thermally treated product, to obtain a coarse-grained product and a fine-grained product both containing the valuable substance;
  a water leaching step of immersing the fine-grained product in water, to obtain a water-leached slurry;
  a wet magnetic sorting step of subjecting the water-leached slurry to wet magnetic sorting, to sort the water-leached slurry into magnetically attractable materials and a slurry of non-magnetically attractable materials; and an acid leaching step of adding an acidic solution to either or both of the slurry of the non-magnetically attractable materials recovered by the wet magnetic sorting and the non-magnetically attractable materials obtained by solid-liquid separation of the slurry of the non-magnetically attractable materials, to adjust pH to 0 or higher and 3.5 or lower and leach the non-magnetically attractable materials, and subsequently performing solid-liquid separation to obtain an acid leaching liquid and an acid leaching residue.

<2> The method for recovering a valuable substance according to <1>, wherein in the thermal treatment step, the lithium ion secondary battery is thermally treated at a temperature of 750° C. or higher.

<3> The method for recovering a valuable substance according to <1> or <2>, wherein the acid leaching residue obtained in the acid leaching step is a carbon (C) concentrate having a carbon (C) grade of 80% or higher.

<4> The method for recovering a valuable substance according to any one of <1> to <3>, wherein a magnetic field intensity in the wet magnetic sorting step is 1,500 G or higher and 8,000 G or lower.

<5> The method for recovering a valuable substance according to any one of <1> to <4>, wherein a solid-liquid ratio of the water-leached slurry obtained in the water leaching step is 5% or higher and 67% or lower.

<6> The method for recovering a valuable substance according to any one of <1> to <5>, wherein in the wet magnetic sorting step, the wet magnetic sorting is performed after a dispersant is added to the water-leached slurry.

<7> The method for recovering a valuable substance according to any one of <1> to <6>, wherein in the water leaching step, a dispersion treatment by ultrasonic waves or by stirring is performed.

<8> The method for recovering a valuable substance according to any one of <1> to <7>, wherein the wet magnetic sorting step is performed over multiple stages.

<9> The method for recovering a valuable substance according to any one of <1> to <8>, wherein a cobalt (Co) grade in the magnetically attractable materials recovered in the wet magnetic sorting step is higher than 10%, and a recovery rate of cobalt (Co) into the magnetically attractable materials is 50% or higher.

<10> The method for recovering a valuable substance according to any one of <1> to <9>, including a neutralizing step of neutralizing the acid leaching liquid with an alkali.

<11> The method for recovering a valuable substance according to any one of <1> to <10>, including after the wet magnetic sorting step, a solid-liquid separation step of subjecting the slurry of the non-magnetically attractable materials to solid-liquid separation into a filtrate and a filtration residue, wherein the method includes a neutralizing step of neutralizing a mixture liquid, in which the filtrate obtained in the solid-liquid separation step and the acid leaching liquid obtained in the acid leaching step are mixed, with an alkali.

<12> The method for recovering a valuable substance according to <10> or <11>, wherein the alkali contains a calcium compound.

<13> The method for recovering a valuable substance according to any one of <10> to <12>, wherein the alkali contains calcium hydroxide.

<14> The method for recovering a valuable substance according to any one of <10> to <13>, wherein the acidic solution used in the acid leaching step is sulfuric acid, and in the neutralizing step, the acid leaching liquid or the mixture liquid is neutralized until an amount of sulfuric acid ions in a liquid obtained by neutralization becomes 10.0 g/L or less.

<15> The method for recovering a valuable substance according to any one of <1> to <14>, wherein a sulfuric acid ion concentration in the acid leaching liquid obtained in the acid leaching step is 50,000 mg/L or lower.

<16> The method for recovering a valuable substance according to any one of <10> to <15>, including a calcium solidification removing step of solidifying calcium ions in a liquid obtained by solid-liquid separation of a slurry obtained in the neutralizing step, to separate the calcium ions.

<17> The method for recovering a valuable substance according to <16>, wherein the calcium solidification removing step is performed by adding a substance containing carbon dioxide.

<18> The method for recovering a valuable substance according to <17>, wherein the substance containing carbon dioxide is a carbonate of an alkali metal.

<19> The method for recovering a valuable substance according to any one of <16> to <18>, wherein a liquid temperature of the liquid that is the target of the calcium solidification removing step is 40° C. or lower, and a lithium concentration in the liquid is lower than 5,000 mg/L.

<20> The method for recovering a valuable substance according to any one of <10> to <19>, wherein an ion adsorption removing step using either or both of an anion exchange resin and a cation exchange resin is performed after the neutralizing step.

<21> The method for recovering a valuable substance according to any one of <16> to <20>, wherein a calcium adsorption removing step using a cation exchange resin is performed after the neutralizing step or the calcium solidification removing step.

<22> The method for recovering a valuable substance according to <21>, wherein before the calcium adsorption removing step or after the calcium adsorption removing step, a liquid from which cations have been removed by adsorption is subjected to preparatory concentration by electrodialysis.

<23> The method for recovering a valuable substance according to <22>, wherein a substance containing carbon dioxide is supplied to a liquid obtained by the preparatory concentration to crystallize lithium carbonate, and solid-liquid separation is performed subsequently to obtain lithium carbonate and a post-crystallization liquid.

<24> The method for recovering a valuable substance according to any one of <21> to <23>, wherein the liquid from which calcium has been removed by solidification or the liquid from which calcium has been removed by adsorption is heated to decrease solubility of lithium carbonate, and solid-liquid separation is performed subsequently to recover lithium carbonate and a post-crystallization liquid.

<25> The method for recovering a valuable substance according to any one of <21> to <24>, wherein the liquid from which calcium has been removed by solidification or the liquid from which calcium has been removed by adsorption is evaporatively concentrated, and solid-liquid separation is performed subsequently to recover lithium carbonate and a post-crystallization liquid.

<26> The method for recovering a valuable substance according to any one of <23> to <25>, wherein the post-crystallization liquid is repeatedly subjected to a neutralizing step, to ultimately crystallize lithium carbonate derived from the post-crystallization liquid.

<27> The method for recovering a valuable substance according to any one of <1> to <26>, wherein cobalt sulfate or nickel sulfate is refined from the magnetically attractable materials, and lithium carbonate or lithium hydroxide is recovered from a post-recovery liquid from which cobalt sulfate or nickel sulfate has been recovered.

Advantageous Effects of Invention

The present invention can solve the various problems in the related art, and can provide a method for recovering a valuable substance, the method being able to recover a high-grade carbon (C) concentrate and lithium carbonate (having low fluorine, sulfuric acid, and calcium grades) from a lithium ion secondary battery and to also recover carbon, lithium carbonate, cobalt, and nickel from a lithium ion secondary battery at low costs and easily (through a small number of steps in a short time) at high recovery rates. The present invention can also provide a method for recovering a valuable substance, the method being able to recover lithium carbonate having low fluorine, sulfuric acid, and calcium grades.

Figure 1:
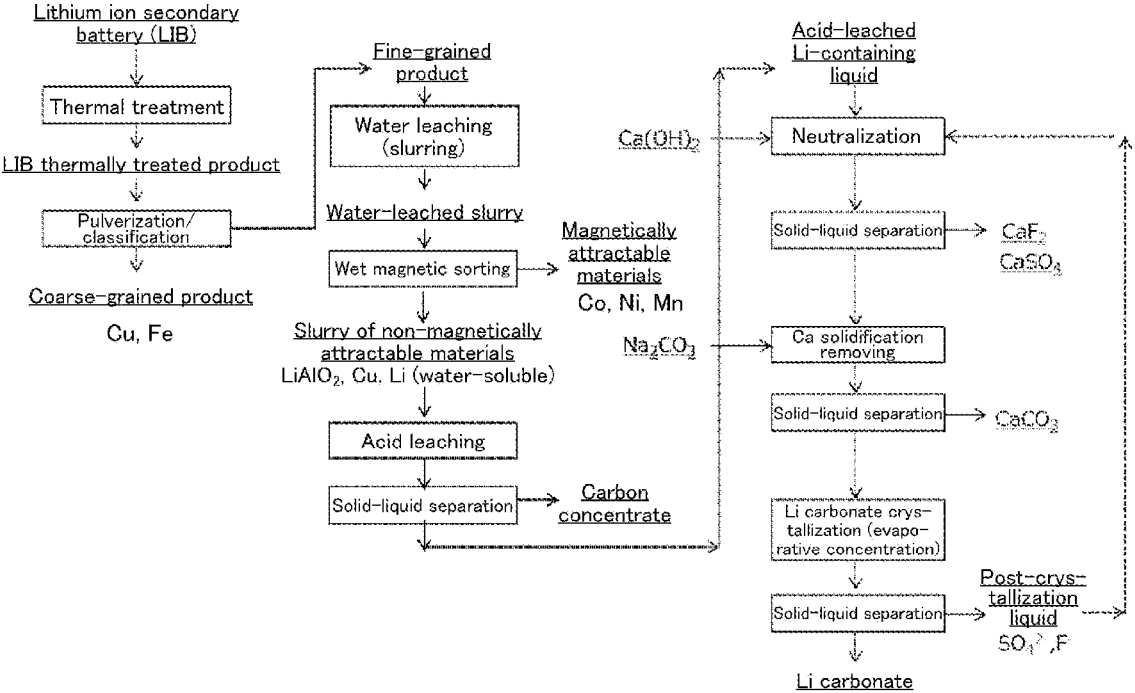
FIG. 1 is a diagram illustrating an example of a flow of processes according to a first embodiment of a method for recovering a valuable substance of the present invention.

DESCRIPTION OF EMBODIMENTS (Method for Recovering Valuable Substance)

A method for recovering a valuable substance of the present invention includes a thermal treatment step, a pulverizing/classifying step, a water leaching step, a wet magnetic sorting step, and an acid leaching step, preferably includes a solid-liquid separation step and a neutralizing step, and further includes other steps as needed.

The method for recovering a valuable substance of the present invention is a method for recovering a valuable substance from a lithium ion secondary battery.

A valuable substance represents a substance having a value that makes the substance suffice as a transaction object without being discarded. Examples of the valuable substance include various metals. Examples of valuable substances in a lithium ion secondary battery include a high-grade carbon (C) concentrate, copper (Cu), aluminum (Al), lithium (Li), cobalt (Co), and nickel (Ni). A carbon (C) concentrate having a high grade (a carbon (C) grade of 80% or higher) is used as, for example, a reductant in smelting of metals.

—Lithium Ion Secondary Battery—

The lithium ion secondary battery is not particularly limited and may be appropriately selected in accordance with the intended purpose. Examples of the lithium ion secondary battery include defective lithium ion secondary batteries generated in the production process of lithium ion secondary batteries, lithium ion secondary batteries discarded due to, for example, defects of the devices in which they are used and expired life of the devices in which they are used, and used lithium ion secondary batteries discarded due to expired life.

For example, the shape, structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller or a cooling device.

Examples of the lithium ion secondary battery include a lithium ion secondary battery including a positive electrode, a negative electrode, a separator, an electrolytic solution containing an electrolyte and an organic solvent, and an exterior container, which is a battery case in which the positive electrode, the negative electrode, the separator, and the electrolytic solution are contained. A lithium ion secondary battery from which, for example, a positive electrode or a negative electrode is lost, may also be used.

——Positive Electrode——

The positive electrode is not particularly limited and may be appropriately selected in accordance with the intended purpose so long as the positive electrode contains a positive electrode active substance.

The shape of the positive electrode is not particularly limited and may be appropriately selected in accordance with the intended purpose. Examples of the shape of the positive electrode include a flat plate shape and a sheet shape.

———Positive Electrode Current Collector———

The shape, structure, size, and material of a positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

A positive electrode material is not particularly limited and may be appropriately selected in accordance with the intended purpose. Examples of the positive electrode material include a positive electrode material that contains at least a positive electrode active substance containing lithium, and that contains a conducting agent and a binder resin as needed.

Examples of the positive electrode active substance include lithium manganate ($LiMn_2O_4$) referred to as an LMO system, lithium cobaltate ($LiCoO_2$) referred to as an LCO system, $LiNi_xCo_yMn_zO_2$ (x+y+z=1) referred to as a ternary system and an NCM system, $LiNi_xCo_yAl_z$ (x+y+z=1) referred to as an NCA system, lithium iron phosphate ($LiFePO_4$), lithium cobalt-nickelate ($LiCo_{1/2}Ni_{1/2}O_2$), and lithium titanate ($Li_2TiO_3$). As the positive electrode active substance, these materials may be used in combination.

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrenebutadiene rubbers.

———Negative Electrode———

The negative electrode is not particularly limited and may be appropriately selected in accordance with the intended purpose so long as the negative electrode contains a negative electrode active substance containing carbon (C).

The shape of the negative electrode is not particularly limited and may be appropriately selected in accordance with the intended purpose. Examples of the shape of the negative electrode include a flat plate shape and a sheet shape.

———Negative Electrode Current Collector———

For example, the shape, structure, size, and material of a negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode active substance is not particularly limited and may be appropriately selected in accordance with the intended purpose so long as the negative electrode active substance contains carbon (C). Examples of the negative electrode active substance include carbon materials such as graphite and hard carbon. As the negative electrode active substance, non-carbon materials such as titanate and silicon may be used in combination with carbon.

The material of the exterior container (housing) of the lithium ion secondary battery is not particularly limited and may be appropriately selected in accordance with the intended purpose. Examples of the material of the exterior container include aluminum, iron, stainless steel, and resins (plastics).

Each step of the method for recovering a valuable substance of the present invention will be described in detail below.

<Thermal Treatment Step>

The thermal treatment step is a step of thermally treating a lithium ion secondary battery, to obtain a thermally treated product. A thermally treated product (roasted product) represents a product obtained by thermally treating a lithium ion secondary battery.

The method for the thermal treatment in the thermal treatment step is not particularly limited and may be appropriately selected in accordance with the intended purpose. For example, it is possible to thermally treat a target by heating the target in a known roasting furnace.

The roasting furnace is not particularly limited and ay be appropriately selected in accordance with the intended purpose. Examples of the roasting furnace include batch-type furnaces such as a rotary kiln, a fluidized bed furnace, a tunnel furnace, and a muffle, a cupola, and a stoker furnace.

The atmosphere used in the thermal treatment is not particularly limited and may be appropriately selected in accordance with the intended purpose.

Examples of the atmosphere include an atmospheric atmosphere, an inert atmosphere, a reducing atmosphere, and a hypoxic atmosphere.

The atmospheric atmosphere (air atmosphere) represents an atmosphere using open air (air) in which oxygen accounts for about 21% by volume and nitrogen accounts for about 78% by volume.

Examples of the inert atmosphere include an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 11% or lower.

<<Thermal Treatment Conditions>>

The conditions (thermal treatment conditions) for thermally treating (heating) a target are not particularly limited and may be appropriately selected in accordance with the intended purpose, so long as the conditions enable the respective constituent components of the target to be pulverized separately in a pulverizing/classifying step described below.

Examples of the thermal treatment conditions include a thermal treatment temperature and a thermal treatment time.

The thermal treatment temperature represents a temperature of a lithium ion secondary battery which is the target of the thermal treatment. It is possible to measure the thermal treatment temperature by inserting a thermometer such as a thermocouple or a thermistor into the target during the thermal treatment.

The temperature (thermal treatment temperature) in the thermal treatment is preferably 750° C. or higher, more preferably 750° C. or higher and 1,080° C. or lower, and particularly preferably 750° C. or higher and 900° C. or lower. When the thermal treatment temperature is 750° C. or higher, lithium in $Li(Ni/Co/Mn)O_2$ contained in the positive electrode active substance or in $LiPF_6$ contained in the electrolyte can be transformed to lithium-containing substances that are in a form soluble in an aqueous solution, such as lithium fluoride (LiF), lithium carbonate ($Li_2CO_3$), and lithium oxide ($Li_2O$), so lithium can be separated from impurities other than fluorine during leaching. Moreover, when the thermal treatment temperature is 750° C. or higher, cobalt oxide and nickel oxide contained in the positive electrode active substance are reduced to metals. Besides, it is possible to grow these metals to a particle diameter with which it is easy to magnetically attract the metals in the subsequent magnetic sorting. This increase in the particle diameter is more apparent as the thermal treatment is performed at a higher temperature.

It is preferable that the exterior container of the lithium ion secondary battery be formed of a material having a melting point higher than the thermal treatment temperature. When the exterior container of the lithium ion secondary battery is formed of a material having a melting point lower than the thermal treatment temperature, it is preferable to perform the thermal treatment in a hypoxic atmosphere having an oxygen concentration of 11 vol % or lower, or by setting at least the oxygen concentration inside the lithium ion secondary battery being roasted (particularly, at the positive electrode current collector and the negative electrode current collector disposed inside the exterior container of the lithium ion secondary battery) to 11 vol % or lower.

A hypoxic atmosphere may be realized by a method of, for example, placing a lithium ion secondary battery, or a positive electrode or a negative electrode thereof in an oxygen shielding container and thermally treating the lithium ion secondary battery, or the positive electrode or the negative electrode thereof. The material of the oxygen shielding container is not particularly limited and may be appropriately selected in accordance with the intended purpose so long as the material has a melting point higher than or equal to the thermal treatment temperature. For example, when the thermal treatment temperature is 800° C., examples of the material include iron and stainless steel having a melting point higher than this thermal treatment temperature.

It is preferable to form an opening in the oxygen shielding container in order to release a gas pressure due to combustion of an electrolytic solution in a lithium ion secondary battery or in a laminate. It is preferable to form an opening in a manner that the opening area of the opening is less than or equal to 12.5% of the surface area of the exterior container in which the opening is formed. It is more preferable that the opening area of the opening be less than or equal to 6.3% of the surface area of the exterior container in which the opening is formed. For example, the shape, size, and forming position of the opening are not particularly limited and may be appropriately selected in accordance with the intended purpose.

By thermally treating a lithium ion secondary battery in a state of being contained in the oxygen shielding container, it is possible to keep carbon in the negative electrode active substance remaining without being combusted, and to improve the recovery rate of carbon.

The time (thermal treatment time) for which a lithium ion secondary battery is thermally treated is not particularly limited, may be appropriately selected in accordance with the intended purpose, and is preferably 1 minute or longer and 5 hours or shorter, and more preferably 1 minute or longer and 2 hours or shorter. The thermal treatment time needs at least to be a thermal treatment time taken until a lithium-containing compound reaches a desired temperature. At a moderate temperature elevation rate, generation of insoluble oxides of lithium can be suppressed and the water leaching rate of lithium can be improved. In addition, the amount of an acid used in acid leaching of non-magnetically attractable materials described below can be saved. The time for which the temperature is retained at the elevated temperature may be short. The water leaching rate of lithium is better as the thermal treatment time is longer. On the other hand, when the thermal treatment time is longer than 5 hours, carbon loss occurs due to combustion of carbon, metals such as copper to be recovered into a coarse-grained product in a classifying step are oxidized and have a poorer quality as valuable substances, and the costs of fuels and electricity spent in the thermal treatment increase. Hence, the thermal treatment time is preferably 5 hours or shorter. When the thermal treatment time is the preferable time, there is an advantage in terms of the costs taken for the thermal treatment and productivity.

In the method for recovering a valuable substance of the present invention, it is possible to melt and separate aluminum derived from the exterior container by setting the thermal treatment temperature to 750° C. or higher.

In the thermal treatment step of the method for recovering a valuable substance of the present invention, the positive electrode active substance is sufficiently decomposed and becomes lithium carbonate and lithium oxide forms that are easily soluble in water, to have a higher leaching rate in the water leaching step, whereas aluminum contained in, for example, the exterior container and the positive electrode current collector reacts to produce lithium aluminate ($LiAlO_2$) that is sparingly soluble in water. However, also in this case, it is possible to dissolve lithium aluminate in the acid leaching step, and to recover lithium (Li) at a high recovery rate.

<Pulverizing/Classifying Step (Pulverizing Process)>

The pulverizing/classifying step (pulverizing process) includes a process of pulverizing a thermally treated product (a product obtained by thermally treating a lithium ion secondary battery), to obtain a pulverized product.

The pulverizing process is not particularly limited and may be appropriately selected in accordance with the intended purpose so long as a pulverized product can be obtained by pulverization of a thermally treated product (roasted product). A pulverized product represents a product obtained by pulverizing a thermally treated product.

In the pulverizing process, it is preferable to obtain a pulverized product by pulverizing a thermally treated product by, for example, an impact. When the exterior container of a lithium ion secondary battery does not melt during the thermal treatment, it is more preferable to perform a preparatory pulverization, in which a thermally treated product is cut with a cutting device, before applying an impact to the thermally treated product.

The pulverizing process may be a wet process. In this case, it is possible to prevent loss of the positive electrode and negative electrode active substances such as carbon, cobalt, and nickel due to scattering during pulverization, and to do without a dust collector for preventing the loss. A wet process also enables the whole mass of water-soluble lithium contained in the thermally treated product in the ongoing pulverizing process to be recovered into water. Here, it is optional to perform pulverization with a dispersant added to water, or to subject a slurry obtained by the pulverizing process to a dispersion treatment. By subjecting the slurry obtained by the pulverizing process to a dispersion treatment, it is possible to improve the classification efficiency in the subsequent classifying step. Use of a dispersant can improve the classification efficiency better than when a dispersant is not used.

Examples of the pulverizing method by an impact include a method of throwing the thermally treated product using a rotating beating board and slamming the thermally treated product against an impact board to apply an impact, and a method of beating the thermally treated product using a rotating beater. Specifically, the method can be performed with, for example, a hammer crusher. Other examples of the pulverizing method by an impact include a method of beating the thermally treated product using a ball formed of, for example, ceramic. The method can be performed with, for example, a ball mill. Pulverization by an impact may be performed using, for example, a biaxial crusher configured to perform pulverization by compression and having a short width of cut and a short blade length.

Examples of the pulverizing method by an impact also include a method of beating the thermally treated product with two rotating chains to apply an impact. This method can be performed with a chain mill.

By pulverization of the thermally treated product by an impact, the positive electrode current collector (for example, aluminum (Al)) is pulverized, whereas the negative electrode current collector (for example, copper (Cu)) that does not significantly change in the form exists in the form of, for example, a foil. Therefore, in the pulverizing/classifying step, the negative electrode current collector does not go beyond being cut. Hence, it is possible to obtain a pulverized product in which valuable substances derived from the positive electrode current collector (for example, aluminum) and valuable substances derived from the negative electrode current collector (for example, copper (Cu)) can be efficiently separated from each other in a pulverizing/classifying step described below.

The pulverization time in the pulverizing process is not particularly limited and may be appropriately selected in accordance with the intended purpose. The pulverization time per 1 kg of a lithium ion secondary battery is preferably 1 second or longer and 30 minutes or shorter, more preferably 2 seconds or longer and 10 minutes or shorter, and particularly preferably 3 seconds or longer and 5 minutes or shorter.

<Pulverizing/Classifying Step (Classifying Process)>

The pulverizing/classifying step (classifying process) includes a process of classifying a pulverized product to obtain a coarse-grained product and a fine-grained product both containing a valuable substance.

The classifying process is not particularly limited and may be appropriately selected in accordance with the intended purpose so long as a coarse-grained product (oversize product) and a fine-grained product (undersize product) can be obtained by classification of a pulverized product.

The classifying method is not particularly limited and may be appropriately selected in accordance with the intended purpose. For example, a vibrating sieve, a multi-stage vibrating sieve, a cyclone, and a JIS Z8801 standard sieve may be used for classification. By classification, for example copper (Cu) and iron (Fe) can be separated into a coarse-grained product, and lithium, cobalt, nickel, or carbon can be concentrated in a fine-grained product.

The classifying method may be a wet process. In this case, it is possible to prevent loss of the positive electrode and negative electrode active substances such as carbon, cobalt, and nickel due to scattering during pulverization, and to do without a dust collector for preventing the loss. A wet process also enables the whole mass of water-soluble lithium contained in the thermally treated product (coarse-grained product and fine-grained product) in the ongoing classifying process to be recovered into water. Here, it is optional to perform classification with a dispersant added to water, or to subject a slurry obtained by the classification to a dispersion treatment. By subjecting the slurry obtained by the pulverizing process to a dispersion treatment, it is possible to improve the efficiency of the subsequent magnetic sorting step for the fine-grained product. Use of a dispersant can improve this efficiency better than when a dispersant is not used.

The particle size (classification point or mesh size of a sieve) for classification is not particularly limited and may be appropriately selected in accordance with the intended purpose. When it is intended to separate, for example, copper (Cu), iron (Fe), and aluminum (Al) into the coarse-grained product and concentrate, for example, carbon (C), lithium (Li), cobalt (Co), nickel (Ni), and manganese (Mn) in the fine-grained product by classification, the particle size for classification is preferably 0.6 mm or greater and 2.4 mm or less, and more preferably 0.85 mm or greater and 1.7 mm or less. When the particle size for classification is 2.4 mm or less, it is possible to suppress inclusion of, for example, copper (Cu), iron (Fe), and aluminum (Al) into the fine-grained product. When the particle size for classification is 0.6 mm or greater, it is possible to suppress inclusion of, for example, carbon (C), lithium (Li), cobalt (Co), nickel (Ni), and manganese (Mn) into the coarse-grained product.

When a sieve is used as the classifying method, classification performed by placing a loosening-promoting object such as stainless-steel balls or alumina balls on the sieve in order to separate small pulverized products adhering to large pulverized products from the large pulverized products enables efficient separation into the large pulverized products and the small pulverized products. This can better improve the grades of metals to be recovered.

The pulverizing process and the classifying process may be performed simultaneously. For example, these processes may be performed as a pulverizing/classifying step (pulverization and classification) of pulverizing a thermally treated product obtained in the thermal treatment step while classifying an obtained pulverized product into a coarse-grained product and a fine-grained product.

Classification into a coarse-grained product and a fine-grained product may be repeated multiple times. Classification performed multiple times can even more reduce the impurity grade in each product.

For example, in order to increase the cobalt (Co) and nickel (Ni) grades in the fine-grained product, three-stage sieving may be performed at classification points of, for example, greater than 1.7 mm, 1.7 mm or greater and 0.85 mm or less, and less than 0.85 mm. As a result, lithium ion secondary battery components such as copper and iron that have an average particle diameter greater than that of cobalt and nickel can be separated above the sieve at the first stage, and carbon (C) that has an average particle diameter smaller than that of cobalt (Co) and nickel (Ni) can be separated below the sieve. Hence, more highly concentrated Co and Ni can be obtained from above the second and third sieves.

<Water Leaching Step>

The water leaching step is a step of immersing the fine-grained product in water to obtain a water-leached slurry.

In the present invention, after the pulverizing/classifying step, the fine-grained product is immersed in water, to perform the water leaching step of obtaining a water-leached slurry (suspension). The "water leaching step" may also be referred to as a "slurring step".

The water leaching step is not particularly limited and may be appropriately selected in accordance with the intended purpose so long as the water leaching step is a step of immersing (dipping or placing into water) the fine-grained product recovered in the pulverizing/classifying step in water, to leach lithium into water and obtain a water-leached slurry.

When the pulverizing step or the classifying step is a wet process, the pulverizing step or the classifying step may function as the water leaching step.

The water into which the fine-grained product is leached is not particularly limited and may be appropriately selected in accordance with the intended purpose. Examples of the water include, industrial water, tap water, pure water such as ion-exchanged water, ultrafiltrated water, reverse osmotic water, and distilled water, and ultrapure water.

For example, by immersing a fine-grained product containing lithium oxide ($Li_2O$) or lithium carbonate ($Li_2CO_3$) in water, it is possible to leach lithium into water in the form of lithium hydroxide (LiOH) or lithium carbonate ($Li_2CO_3$) and recover lithium highly efficiently. Hence, in the present invention, it is preferable that the water-leached slurry contain lithium.

The leaching method in the water leaching step is not particularly limited and may be appropriately selected in accordance with the intended purpose. Examples of the leaching method include a method of simply leaving a fine-grained product in water, a method of supplying a fine-grained product into water and stirring the resultant, a method of supplying a fine-grained product into water and gently stirring the resultant by applying ultrasonic waves, and a method of adding water to a fine-grained product. As the leaching method, for example, the method of supplying a fine-grained product into water and stirring the resultant is preferable, and the method of supplying a fine-grained product into water and gently stirring the resultant by applying ultrasonic waves is more preferable.

The solid-liquid ratio of the water-leached slurry obtained in the water leaching step is not particularly limited, may be appropriately selected in accordance with the intended purpose, and is preferably 5% or higher and 67% or lower and more preferably 10% or higher and 40% or lower. When the solid-liquid ratio is lower than 5%, there is a tendency that the concentration of lithium that has dissolved in the leaching liquid is low, and the recovery efficiency and the concentration efficiency of lithium are low. When the solid-liquid ratio is higher than 67%, the rate at which lithium leaches into water may be low, and problems such as clogging of delivery conduits may occur when the water-leached slurry is delivered to the next step without being diluted. Moreover, the recovery rates of cobalt and nickel into magnetically attractable materials and the recovery rate of carbon into non-magnetically attractable materials when the slurry is supplied to the subsequent wet magnetic sorting step may be low (i.e., the performance of separation between cobalt and nickel, and carbon may be low).

The stirring speed of the water-leached slurry in the water leaching step is not particularly limited, may be appropriately selected in accordance with the intended purpose, and is preferably for example, 400 rpm.

The leaching time in the water leaching step is not particularly limited, may be appropriately selected depending on the intended time, and is preferably for example, 1 hour.

<Wet Magnetic Sorting Step>

The wet magnetic sorting step is a step of subjecting the water-leached slurry to wet magnetic sorting after the water leaching step, to sort the water-leached slurry into magnetically attractable materials and a slurry of non-magnetically attractable materials. A "slurry of non-magnetically attractable materials" represents a suspension containing non-magnetically attractable materials.

The wet magnetic sorting step is not particularly limited and may be appropriately selected in accordance with the intended purpose so long as the wet magnetic sorting step is a step through which the water-leached slurry can be sorted into magnetically attractable materials and a slurry of non-magnetically attractable materials.

In the present invention, the magnetically attractable materials are supposed to have high Co and Ni grades and low impurity grades. Therefore, Co and Ni obtained in the wet magnetic sorting step can be used as they are as raw materials (for example, cobalt sulfate and nickel sulfate) from which to obtain materials for producing secondary batteries or as raw materials from which to smelt cobalt and nickel without any additional Co and Ni concentrating step such as acid leaching, neutralization, and solvent extraction.

Lithium contained in the magnetically attractable materials may be recovered in the form of lithium carbonate or lithium hydroxide through the process of obtaining materials for producing lithium ion secondary batteries or through the process of obtaining raw materials from which to smelt cobalt and nickel. By recovering lithium contained in the magnetically attractable materials, it is possible to recover greater than or equal to 70% by mass of lithium that has been contained in the lithium ion secondary battery in the form of lithium carbonate or lithium hydroxide.

A magnetically attractable material represents a material that can be attracted to a magnetic force source by an attractive force generated between the material and the magnetic force source by a magnetic force generated by the magnetic force source configured to generate a magnetic force (a magnetic field) (for example, a magnet and an electromagnet). Examples of the magnetically attractable material include ferromagnetic metals. Examples of ferromagnetic metals include iron (Fe), nickel (Ni), and cobalt (Co).

A non-magnetically attractable material represents a material that is not attracted to the magnetic force source by a magnetic force generated by the magnetic force source. The non-magnetically attractable material is not particularly limited and may be appropriately selected in accordance with the intended purpose. Examples of non-magnetically attractable metal materials include paramagnetic or diamagnetic metals. Examples of paramagnetic or diamagnetic metals include aluminum (Al), manganese (Mn), gold (Au), silver (Ag), and copper (Cu).

The wet magnetic sorting step is not particularly limited and may be performed using a known wet magnetic sorter.

The wet magnetic sorter that can be used in the present invention is not particularly limited and may be appropriately selected in accordance with the intended purpose. Examples of the wet magnetic sorter include a drum-shaped magnetic sorter and a high-gradient magnetic sorter.

Wet magnetic sorting conditions for performing the wet magnetic sorting step are not particularly limited and may be appropriately selected in accordance with the intended purpose.

In the wet magnetic sorting step, for example, cobalt (Co), nickel (Ni), and manganese (Mn) integrated with cobalt are recovered as the magnetically attractable materials.

When magnetically sorting the fine-grained product obtained in the pulverizing/classifying step by, for example, a dry process, particles may aggregate due to moisture adherent between the particles, and it may be impossible to sufficiently separate metal particles derived from the negative electrode current collector and particles of the negative electrode active substances, 10% or more of which is contained in the fine-grained product, from cobalt and nickel particles. Hence, in the present invention, it is preferable to separate substances derived from the negative electrode active substances and metals derived from the negative electrode current collector into the slurry of the non-magnetically attractable materials and recover cobalt and nickel as the magnetically attractable materials in the wet magnetic sorting step.

The solid-liquid ratio of the slurry supplied the wet magnetic sorting is not particularly limited, may be appropriately selected in accordance with the intended purpose, and is preferably 5% or higher and 67% or lower and more preferably 10% or higher and 40% or lower. When the solid-liquid ratio is lower than 5%, the recovery rates of cobalt and nickel as the magnetically attractable materials in the wet magnetic sorter may be low. When the solid-liquid ratio is higher than 67%, problems such as clogging of pumps when supplying the slurry are likely to occur, and the performance of separation between cobalt and nickel (magnetically attractable materials), and non-magnetically attractable materials such as carbon may be low.

As the slurry the water-leached slurry obtained in the water leaching step may be supplied as it is, or the solid-liquid ratio of the slurry obtained in the water leaching step may be adjusted by concentration or dilution by solid-liquid separation such as precipitation separation. The solid-liquid ratio may be adjusted by dilution of the water-leached slurry by adding water.

The method for supplying the slurry is not particularly limited and may be appropriately selected in accordance with the intended purpose. It is optional to supply the slurry via a pump while stirring the slurry in a tank.

The magnetic field intensity of the magnetic sorter used in the wet magnetic sorting is preferably 500 G or higher and 20,000 G or lower, more preferably 1,000 G or higher and 10,000 G or lower, and particularly preferably 1,500 G or higher and 8,000 G or lower. When the magnetic field intensity is lower than 500 G, it becomes harder to magnetically attract particles of cobalt and nickel, the recovery rates of cobalt and nickel into the magnetically attractable materials are likely to be low. When the magnetic field intensity is higher than 20,000 G, the recovery rates of impurities other than cobalt and nickel into the magnetically attractable materials are high, and the cobalt and nickel grades in the magnetically attractable materials are low.

A dispersant may be added to the water-leached slurry to which the wet magnetic sorting is applied. By adding a dispersant, it is possible to promote separation between cobalt and nickel, and other battery constituting components, and to reduce the grades of impurity components other than cobalt and nickel in the magnetically attractable materials obtained by the wet magnetic sorting. The addition amount of the dispersant is preferably 50 mg/L or greater. The method for adding the dispersant is not particularly limited and may be appropriately selected in accordance with the intended purpose. Examples of the method include a method of supplying a dispersant into a tank in which the slurry is stirred, and supplying the slurry to the wet magnetic sorter via a pump while stirring the slurry. In this way it is possible to supply the slurry to the wet magnetic sorter in a state where the respective components are previously improved in dispersion and separability into individual bodies (particularly dispersion between cobalt and nickel, and carbon), and to consequently improve the separation performance between cobalt and nickel, and other components by the wet magnetic sorting.

In the tank, components that have a high precipitation rate such as cobalt, nickel, and copper concentrate in the bottom of the tank, and components that have a low precipitation speed such as carbon concentrate in the top of the tank. Therefore, for example, by withdrawing the slurry from the bottom of the tank, it is possible to supply the slurry, from which carbon is previously separated, to the wet magnetic sorter, and to reduce the carbon grade in the magnetically attractable materials containing cobalt and nickel. By withdrawing the slurry from the top of the tank, it is possible to recover the slurry, which contains high-grade carbon.

The kind of the dispersant is not particularly limited and may be appropriately selected in accordance with the intended purpose. For example, dispersants used in the fields of dyes, pigments, agricultural chemicals, and inorganic substances may be used.

Examples of the dispersant include condensates of aromatic sulfonic acids and formalin, or anionic surfactants mainly formed of special carboxylic acid-based polymeric surfactants (for example, "DEMOL" series surfactants available from Kao Corporation).

It is preferable to disperse particles in the slurry to which the wet magnetic sorting is applied, by an ultrasonic process or a stirring process. By performing the process for dispersing the particles, it is possible to promote separation between cobalt and nickel, and other battery constituting components, and to reduce the grades of impurity components other than cobalt and nickel in the magnetically attractable materials obtained by the wet magnetic sorting. For the stirring process, for example, a stirring blade such as a disk turbine can be used, and high-speed stirring (with a high discharging hydrodynamic power) within the tolerable range of the device is preferable.

The magnetically attractable materials recovered in the wet magnetic sorting step contain moisture. The moisture may be removed by solid-liquid separation using, for example, filter paper, a filter press, or a centrifuge, by air drying, or by heating and drying with a drier.

Solid-liquid separation may be after the obtained magnetically attractable materials are washed with water. In this case, fluorine, which failed to be removed from the magnetically attractable materials in the water leaching step, can be decreased to, for example, less than 1%. When using a filter press as the solid-liquid separator, it is possible to perform the washing with water by pouring water into the filtration chamber containing the magnetically attractable materials in the filter press. As the weight of water used for the washing with water, it is preferable to pass water by 0.1 kg or more through an acid leaching residue (1 kg). It is more preferable to pass water by 1 kg or more through an acid leaching residue (1 kg).

The cobalt (Co) grade in the magnetically attractable materials recovered in the wet magnetic sorting step is higher than 10%. The recovery rate of cobalt (Co) into the magnetically attractable materials is preferably 50% or higher and more preferably 70% or higher.

For example, carbon (C), lithium (water-soluble), and $LiAlO_2$ (lithium aluminate) are to be separated from the slurry of the non-magnetically attractable materials.

In the wet magnetic sorting step, a plurality of times of (or, multiple-stage) wet magnetic sorting may be performed. For example, by subjecting the magnetically attractable materials recovered in the first wet magnetic sorting step to the second wet magnetic sorting (careful selection), it is possible to improve the cobalt (Co) grade in the magnetically attractable materials. In this case, the conditions of the second wet magnetic sorting may be different from the first. By setting stricter conditions for recovering magnetically attractable materials than in the first wet magnetic sorting (for example, a lower magnetic field intensity, a higher magnetic sorting drum rotation number, and a higher feeding rate), it is possible to make the cobalt (Co) grade in the magnetically attractable materials to be recovered in the second wet magnetic sorting higher than the cobalt (Co) grade in the magnetically attractable materials recovered in the first wet magnetic sorting, and to improve the recovery rate of carbon (C) to be recovered into the slurry of the non-magnetically attractable materials better than when the wet magnetic sorting is performed only at one stage.

In another example, by subjecting the slurry of the non-magnetically attractable materials recovered in the first wet magnetic sorting step to the second wet magnetic sorting (scavenging), it is possible to reduce the cobalt grade (Co) in the slurry of the non-magnetically attractable materials. In this case, the conditions of the second wet magnetic sorting may be different from the first. By setting more moderate conditions for recovering magnetically attractable materials than in the first wet magnetic sorting (for example, a higher magnetic field intensity a lower magnetic sorting drum rotation number, and a lower feeding rate), it is possible to make the cobalt (Co) grade in the slurry of the non-magnetically attractable materials to be recovered in the second wet magnetic sorting lower than the cobalt (Co) grade in the slurry of the non-magnetically attractable materials recovered in the first wet magnetic sorting, and to improve the recovery rate of cobalt (Co) to be recovered as the magnetically attractable materials better than when the wet magnetic sorting is performed only at one stage. Water may be added to the slurry of the non-magnetically attractable materials obtained in the wet magnetic sorting. By adjusting the lithium (Li) concentration, it is possible to prevent loss of lithium into a neutralization residue as described in the neutralizing step described below.

<Solid-Liquid Separation Step>

In the present invention, after the wet magnetic sorting step is performed, a solid-liquid separation step of filtrating the slurry of the non-magnetically attractable materials, to perform solid-liquid separation of the slurry of the non-magnetically attractable materials into a filtrate (a water leaching liquid) and a filtration residue (the non-magnetically attractable materials) may be performed.

In the present invention, by the solid-liquid separation step, it is possible to make, for example, carbon (C) and $LiAlO_2$ (lithium aluminate) contained in the slurry of the non-magnetically attractable materials recoverable as the non-magnetically attractable materials. It is also possible to separate lithium (water-soluble) contained in the slurry of the non-magnetically attractable materials into the filtrate.

The obtained water leaching liquid contains lithium mainly in the form of lithium carbonate by, from about some hundreds of milligrams per liter through 3,000 mg/L. Lithium carbonate may be recovered from this water leaching liquid. For example, lithium carbonate having a grade of 99% or higher can be recovered through the steps described below. That is, slaked lime is added to the water leaching liquid, and the resultant is stirred and subsequently subjected the to solid-liquid separation. This can decrease fluorine in the water leaching liquid to about 20 mg/L. Then, the fluorine-removed liquid is blown with a $CO_2$ gas at normal temperature. This can remove calcium ions derived from the slaked lime to less than 5 mg/L. $CO_2$ that is left unused for removing calcium is present in a dissolved state in the calcium-removed liquid. Hence, by concentrating the $CO_2$ gas blown-liquid, it is possible to precipitate lithium carbonate. Because almost no impurities other than fluorine are present in the water leaching liquid, lithium carbonate having a grade of 99% or higher can be recovered.

Meanwhile, by subjecting the obtained non-magnetically attractable materials to the acid leaching step, the neutralizing step, and the other steps described blow, it is possible to recover highly pure lithium carbonate from the non-magnetically attractable materials.

The method for solid-liquid separation is not particularly limited and may be appropriately selected in accordance with the intended purpose. For example, a method of subjecting the slurry of the non-magnetically attractable materials to solid-liquid separation using, for example, filter paper, a filter press, or a centrifuge is preferable.

<Acid Leaching Step>

In the acid leaching step, an acidic solution is added to either or both of the slurry of the non-magnetically attractable materials recovered by the wet magnetic sorting and the non-magnetically attractable materials obtained by the solid-liquid separation of the slurry of the non-magnetically attractable materials, to adjust pH to 0 or higher and 3.5 or lower and leach the non-magnetically attractable materials, and solid-liquid separation is subsequently performed to obtain an acid leaching liquid and an acid leaching residue.

In the present invention, the acid leaching step of obtaining an acid leaching liquid and an acid leaching residue (carbon concentrate) is performed by addition of an acid to the slurry of the non-magnetically attractable materials or immersion of the non-magnetically attractable materials obtained by the solid-liquid separation step of the slurry of the non-magnetically attractable materials in an acidic solution, and subsequent solid-liquid separation. Of these methods, the method of adding an acid to the slurry of the non-magnetically attractable materials is preferred. By adding an acid to the slurry of the non-magnetically attractable materials, it is possible to adjust the lithium concentration in the acid leaching liquid easily to lower than or equal to a predetermined concentration, and to prevent loss of lithium into a neutralization cake, which may occur when the lithium concentration in the acid leaching liquid is high in the neutralizing step described below.

Lithium derived from sparingly water-soluble $LiAlO_2$ (lithium aluminate) has dissolved in the obtained acid leaching liquid. On the other hand, carbon (C) has concentrated at a high grade in the obtained acid leaching residue. Therefore, carbon can be recovered and used as a carbon (C) concentrate.

A preferable method for solid-liquid separation into the acid leaching liquid and the acid leaching residue (carbon concentrate) is use of, for example, filter paper, a filter press, or a centrifuge.

The acidic solution is not particularly limited and may be appropriately selected in accordance with the intended purpose. Examples of the acidic solution include sulfuric acid, nitric acid, and hydrochloric acid. Among these acidic solutions, sulfuric acid is preferable in terms of costs.

pH of the acidic solution used in the acid leaching step is 0 or higher and 3.5 or lower. pH is more preferably 0 or higher and 3 or lower, more preferably 1 or higher and 3 or lower, and particularly preferably 1.5 or higher and 2.5 or lower. When pH is higher than 3.5, impurities in the filtration residue such as lithium aluminate, cobalt, and nickel cannot dissolve effectively. Here, pH of the acidic solution represents pH at the end stage of the acid leaching step. When pH is 0 or higher and 3.5 or lower, 80% or more of Li in the non-magnetically attractable materials can be leached, and besides, a carbon concentrate (acid leaching residue) having a carbon grade of 80% or higher can be obtained. pH of 0 or higher and 3 or lower is preferable because it is possible to leach Li while saving the addition amount of the acid without making the acid leaching rate of Li lower than when pH is 0. pH of 1.5 or higher and 2.5 or lower is particularly preferable because it is possible to leach Li without making the acid leaching rate of Li lower than when pH is 0, and to suppress leaching of copper contained in the slurry of the non-magnetically attractable materials and obtain an acid leaching liquid having a lower impurity concentration. Copper that may be contained in the acid leaching residue (carbon concentrate) may be no problem when the acid leaching residue is used as a raw material for smelting (particularly, a raw material from which to smelt copper). By further performing acid leaching of the acid leaching residue by adding an oxidant to the acid leaching residue, it is possible to remove copper into a leaching liquid and recover a carbon concentrate having a higher grade.

When pH is lower than 0, the sulfuric acid ion concentration in the acid leaching liquid is high, and loss of lithium into a neutralization cake, which may occur in the neutralizing step, is significant.

The sulfuric acid ion concentration in the acid leaching liquid is preferably 50,000 mg/L or lower in order to suppress coprecipitation/adsorption loss of lithium into a neutralization cake due to mass generation of a neutralization cake in the neutralizing step.

When nitric acid and hydrochloric acid are used as the acidic solution, loss of lithium into a neutralization cake can be suppressed, but acid cost increase and equipment corrosion occur as problems.

The leaching method in the acid leaching step is not particularly limited and may be appropriately selected in accordance with the intended purpose. Examples of the method include a method of simply leaving the slurry of the non-magnetically attractable materials or the non-magnetically attractable materials in an acid, a method of supplying the slurry of the non-magnetically attractable materials or the non-magnetically attractable materials into an acid and stirring the resultant, a method of supplying the slurry of the non-magnetically attractable materials or the non-magnetically attractable materials into an acid and stirring the resultant, a method of adding an acid to the slurry of the non-magnetically attractable materials or to the non-magnetically attractable materials, and a method of adding an acid to the slurry of the non-magnetically attractable materials or to the non-magnetically attractable materials and stirring the resultant. As the acid leaching method, for example, the method of adding an acid to the slurry of the non-magnetically attractable materials is preferable, and the method of adding an acid to the slurry of the non-magnetically attractable materials and stirring the resultant is more preferable. By adding an acid to the slurry of the non-magnetically attractable materials, it is possible to suppress temperature elevation due to heat generation during a reaction of the non-magnetically attractable materials with the acid.

The acid stirring speed in the acid leaching step is not particularly limited, may be appropriately selected in accordance with the intended purpose, and may be, for example, 200 rpm.

The liquid temperature during acid leaching is preferably 0° C. or higher and 80° C. or lower and more preferably 10° C. or higher and 40° C. or lower. Fluorine derived from $LiPF_6$ (lithium phosphate hexafluoride), which is an electrolyte in the electrolytic solution of the lithium ion secondary battery has dissolved in the acid leaching liquid in the form of hydrofluoric acid. By adjusting the liquid temperature during acid leaching to 40° C. or lower, it is possible to suppress generation of hydrofluoric acid vapor, which is a harmful and corrosive gas.

During acid leaching, an oxidant may be added. By adding an oxidant, it is possible to promote dissolution of impurities (for example, copper) that hardly dissolve in an acid, and to better improve the carbon (C) grade in the carbon (C) concentrate (acid leaching residue). The oxidant is not particularly limited and may be appropriately selected in accordance with the intended purpose. Examples of the oxidant include hydrogen peroxide, hydrochlorous acid, chlorous acid, chloric acid, perchloric acid, halogen, permanganate, ozone, and air.

The leaching time in the acid leaching step is not particularly limited, may be appropriately selected in accordance with the intended purpose, and may be, for example, 1 hour.

The carbon (C) grade in the acid leaching residue obtained in the acid leaching step is preferably 80% or higher and more preferably 90% or higher.

When using the acid leaching residue (carbon (C) concentrate) as a reductant for smelting, it is preferable to remove phosphorus and fluorine as much as possible from the acid leaching residue (carbon (C) concentrate) because phosphorus (P) is an element that should be avoided in steel smelting and fluorine (F) is an element that may be burdening on the exhaust gas disposal during smelting.

The carbon (C) concentrate contains copper (Cu) as a main impurity. It is possible to separate copper by, for example, dispersing carbon and precipitating copper by a dispersant, by recovering copper to tailings by flotation, or by recovering copper into a heavy product by specific gravity separation.

In order to adjust the lithium (Li) concentration in the acid leaching liquid obtained in the acid leaching step, water may be added to the acid leaching liquid. By reducing the lithium (Li) concentration, it is possible to prevent loss of lithium (Li) into a solution purification residue, as described in the following description of the neutralizing step.

The acid leaching residue may be washed with water, and may be subjected to solid-liquid separation after washing with water. The acidic solution may adhere to the acid leaching residue. By the washing with water, it is possible to reduce the amount of the adherent acidic solution. For example, when sulfuric acid is used as the acidic solution, it is possible to reduce the sulfuric acid grade in the acid leaching residue by washing the acid leaching residue with water and subsequently subjecting the acid leaching residue to solid-liquid separation. When using, for example, a filter press as the solid-liquid separator, it is possible to perform the washing with water by pouring water into the filtration chamber containing the acid leaching residue in the filter press. As the weight of water used for the washing with water, it is preferable to pass water by 0.1 kg or more through 1 kg of the acid leaching residue. It is more preferable to pass water by 1 kg or more through 1 kg of the acid leaching residue.

<Neutralizing Step>

In the present invention, it is preferable to include a neutralizing step of neutralizing the acid leaching liquid obtained in the acid leaching step and subsequently performing solid-liquid separation. The neutralizing step is intended for neutralizing the acid leaching liquid, and separating impurity ions (for example, fluorine ions, sulfuric acid ions, cobalt ions, nickel ions, aluminum ions, and copper ions) other than lithium (Li) by solidification (neutralization caking) and solid-liquid separation. When subjecting the non-magnetically attractable materials recovered by solid-liquid separation of the slurry of the non-magnetically attractable materials to the acid leaching step, it is preferable to include a neutralizing step of neutralizing a liquid (mixture liquid), in which the filtrate (water leaching liquid) obtained in the solid-liquid separation step and the acid leaching liquid obtained in the acid leaching step of the non-magnetically attractable materials are mixed, with an alkali, and subsequently performing solid-liquid separation. This is because the filtrate is alkaline, so the filtrate (alkali) can be utilized for neutralizing the acid leaching liquid.

Solution purification for removing, for example, fluorine (F) is necessary for recovering Li from the filtrate. Advantageously it is possible to purify the filtrate (water leaching liquid) and neutralize the acid leaching liquid simultaneously by once performing neutralization with an alkali.

The water leaching liquid is free of acid-derived anions (for example, sulfuric acid ion when sulfuric acid is used as the acid). Therefore, the acid-derived anion concentration in the mixture liquid can be decreased to lower than the anion concentration in the acid leaching liquid. Hence, the amount of a neutralization cake to be generated per unit liquid volume can be better suppressed when the mixture liquid is neutralized than when the acid leaching liquid is neutralized, and the amount of lithium loss into the neutralization cake due to, for example, coprecipitation or adsorption to the neutralization cake can be better suppressed.

The lithium (Li) concentration in the filtrate (water leaching liquid) is often lower than 3,000 mg/L depending on the solubility of lithium carbonate. This is because the filtrate has an alkaline pH (i.e., pH of 10 or higher), so $CO_3^{2-}$ ions can stably exist in the filtrate. By mixing the filtrate with the acid leaching liquid and thereby adjusting pH of the mixture liquid to lower than 7 and placing the mixture liquid under a condition in which $CO_3^{2-}$ ions cannot be kept dissolved, it is possible to suppress the amount by which $Ca^{2+}$ ions, which will be derived from calcium hydroxide to be added in the next step, will be consumed by $CO_3^{2-}$ ions (i.e., it is possible to utilize a greater amount of $Ca^{2+}$ ions for removing $F^-$ ions). It is also possible to suppress the Li concentration to lower than the standard Li concentration (which may be higher than 3,000 mg/L) in the acid leaching liquid. Hence, it is possible to suppress the amount of a cake generated in the neutralizing step and to thereby suppress the amount of lithium loss into the neutralization cake. Moreover, by adjusting the Li concentration to lower than the solubility of lithium carbonate (i.e., lower than 3,000 mg/L), it is possible to prevent Li loss due to crystallization of lithium carbonate when carbonate ions are added in the calcium solidification removing step.

As described below, addition of carbonate ions is assumed for solidification removing of calcium ions from the liquid obtained by neutralization. The present inventor has found that addition of carbonate ions to a liquid having a Li concentration higher than 5,000 mg/L in the calcium solidification removing step (or a carbonate ion adding step) results in precipitation of Li carbonate together with the solution purification target (for example, calcium (Ca)), i.e., Li loss into the solution purification residue. Judging from this, producing a liquid having a Li concentration of 5,000 mg/L or lower by mixing the filtrate (water leaching liquid) and the acid leaching liquid is advantageous for improving the recovery rate of Li (or for suppressing the amount of Li loss in the calcium solidification removing step).

Also when subjecting the slurry of the non-magnetically attractable materials to the acid leaching step (i.e., without solid-liquid separation), it is preferable to adjust the concentration in a manner that the lithium concentration in the acid leaching liquid may not be higher than 5,000 mg/L for the same reason as described above. Dissolved lithium in the slurry of the non-magnetically attractable materials is mainly lithium carbonate, and the dissolved lithium concentration in the slurry is often lower than 3,000 mg/L. Hence, it is easy to adjust the lithium concentration in the acid leaching liquid to 5,000 mg/L or lower, by, for example, adjusting the solid-liquid ratio of the slurry in the wet magnetic sorting step or by adjusting the concentration of the acid to be added.

Moreover, when subjecting the slurry of the non-magnetically attractable materials to the acid leaching step, almost no dissolved $CO_3^{2-}$ ions are present in the acid leaching liquid for the same reason as described above, and the amount by which $Ca^{2+}$ ions, which will be derived from calcium hydroxide, will be consumed by $CO_3^{2-}$ ions can be suppressed.

The neutralizing step may include neutralization to a plurality of pH levels, and multiple-stage solid-liquid separation. For example, a liquid obtained by the first solid-liquid separation performed after the first neutralization to pH of 9 may be again subjected to pH elevation to pH of 12 (the second neutralization) and may be subsequently subjected to the second solid-liquid separation.

As the alkali, at least calcium hydroxide ($Ca(OH)_2$; slaked lime) is used. Two or more selected from, for example, calcium carbonate, calcium oxide, calcium aluminate, and calcium phosphate may be used in combination. Calcium hydroxide is preferable because, for example, calcium hydroxide has a high fluorine solidifying efficiency can be easily removed in the calcium solidification removing step or the calcium adsorption removing step described below, and can suppress the amount of dissolved calcium ions in the liquid obtained by neutralization because of its relatively low solubility and can save the amount of a solidifying agent ($CO_2$) and the amount of a cation exchange resin necessary for solidification or adsorption. By adding an aluminum compound such as aluminum sulfate, calcium aluminate, aluminum chloride, and aluminum hydroxide before adding the alkali, it is possible to remove more fluorine than when the alkali is used alone. Moreover, during solidification of fluorine, it is optional to co-precipitate aluminum that leaches when lithium is leached, together with fluorine, to thereby use this aluminum as a fluorine remover at the same time as removal of aluminum. When adding the alkali, a solid alkali or a slurried alkali may be added.

When sulfuric acid is used as an acid in the acid leaching step, sulfuric acid ions are contained in the acid leaching liquid. When the alkali contains calcium, it is possible to separate sulfuric acid ions in the form of a solid (calcium sulfate) by solid-liquid separation because sulfuric acid ions and calcium ions produce calcium sulfate. Therefore, the sulfuric acid ion concentration in the neutralized filtrate can be decreased to 1.0 g/L or lower.

pH after the neutralization is preferably from 10.5 through 14 and more preferably from 11 through 13. Here, pH of the solution represents pH at the end stage of the neutralizing step. When pH is from 10.5 through 14, the amount of dissolved calcium ions can be decreased (i.e., the load in the subsequent calcium solidification removing step can be decreased). On the other hand, the present inventor has found it possible to remove fluorine in the acid leaching liquid in the form of calcium fluoride efficiently regardless of this low calcium ion concentration condition. In addition, $CO_2$ to be added in the calcium solidification removing step or a lithium carbonate crystallizing step can be stably absorbed and kept dissolved in the solution in the form of $CO_3^{2-}$.

The amount of lithium in the liquid obtained by solid-liquid separation of the slurry obtained in the neutralizing step is preferably 50% by mass or greater and more preferably 70% by mass or greater when the amount of lithium that has been contained in the fine-grained product is seen to be 100% by mass.

In order to adjust the lithium concentration in the slurry obtained in the neutralizing step or the liquid obtained by solid-liquid separation of the slurry water may be added to the slurry or the liquid. By decreasing the lithium (Li) concentration in the slurry or the liquid, it is possible to prevent lithium (Li) loss.

<Other Steps>

Examples of the other steps include a calcium solidification removing step, an ion adsorption removing step including a calcium adsorption removing step, a preparatory concentration step, and a lithium carbonate crystallizing step. If lithium carbonate is crystallized and recovered without removal of calcium that has dissolved in the neutralizing step, the calcium grade in lithium carbonate is high. Hence, lithium carbonate is crystallized and recovered after either or both of the calcium solidification removing step and the calcium adsorption removing step.

<<Calcium Solidification Removing Step>>

It is optional to perform the calcium solidification removing step in order to solidify calcium ions derived from calcium hydroxide added in the neutralizing step and separate the calcium ions from the liquid obtained by the neutralizing step.

The component used for solidifying the calcium ions is not particularly limited and may be appropriately selected in accordance with the intended purpose so long as the component can solidify the alkali-derived component. Carbonate ion ($CO_3^{2-}$) is preferable. This is because carbonate ion can remove the alkali-derived component easily in the form of a carbonate.

It is preferable to perform the calcium solidification removing step at a liquid temperature of 40° C. or lower. In this case, it is possible to suppress lithium loss due to co-solidification/precipitation of lithium together with calcium, which is the solidification removing target component, provided that the lithium concentration in the liquid before being subjected to calcium solidification removing is 5,000 mg/L or lower. Meanwhile, it is possible to precipitate the alkali-derived component (for example, calcium) in the form of a carbonate (for example, calcium carbonate; $CaCO_3$) and selectively remove the alkali-derived component from the liquid in which lithium is kept dissolved. Moreover, when pH of the liquid obtained by the neutralizing step is high (for example, pH of 10.5 or higher), the liquid obtained by the neutralizing step can efficiently absorb and maintain the carbonate ions ($CO_3^{2-}$) therein, and the liquid, from which Ca has been removed by solidification, can keep dissolved therein, any carbonate ions that have not contributed to removing the alkali-derived component in the calcium solidification removing step, so that the dissolved carbonate ions can be effectively used as a component ($CO_3$) for crystallizing lithium carbonate in a subsequent step.

The method for adding the carbonate ion to the liquid obtained by the neutralizing step (or the liquid obtained by neutralization) is not particularly limited and may be appropriately selected in accordance with the intended purpose.

Examples of the method include a method of supplying (diffusing) a $CO_2$ gas to the liquid obtained by neutralization, and a method of adding a carbonate to the liquid obtained by neutralization. Of these methods, the method of adding a carbonate to the liquid obtained by neutralization is preferable.

As the carbonate, a carbonate containing an alkali metal is particularly preferable, and sodium carbonate is the best preferred in terms of costs. Sulfuric acid ions are present in the liquid obtained by neutralization by about from 2,000 mg/L through 10,000 mg/L. When a $CO_2$ gas is supplied to this liquid and $CO_3^{2-}$ ions are kept dissolved, pH decreases along with decrease of $OH^-$ ions proportional to the amount of dissolved $CO_3^{2-}$ ions based on the electroneutrality principle, because $CO_2$ gas supply does not entail supply of counterions (cations) of $CO_3^{2-}$ (anions). Because $CO_3^{2-}$ ions cannot be stably kept dissolved unless pH is 10 or higher, the soluble amount of $CO_3^{2-}$ ions is restricted by $CO_2$ gas supply.

On the other hand, when $CO_3^{2-}$ ions are supplied by addition of sodium carbonate, $Na^+$ ions are also supplied as counterions of $CO_3^{2-}$ ions. Therefore, pH does not decrease, and $CO_3^{2-}$ ions can be kept dissolved in the liquid obtained by neutralization much more (by an amount enough to crystallize high-grade Li carbonate).

It is possible to additionally remove sulfuric acid ions from the liquid obtained by neutralization (i.e., to decrease sulfuric acid ions to less than 2,000 mg/L), by supplying a calcium salt (for example, calcium chloride) having a higher solubility than slaked lime and thereby supplying $Ca^{2+}$ ions and forming $CaSO_4$. In this case, the liquid obtained by neutralization contains chlorine, the amount of a neutralization cake increases, the $Ca^{2+}$ ion concentration in the liquid obtained by neutralization increases (the $Ca^{2+}$ ion concentration exceeds 1,000 mg/L), the load in the subsequent calcium removal increases, and the steps become complicated. Hence, this is not carried out in the present invention.

To put it oppositely, it is possible to recover high-quality lithium carbonate containing no sulfuric acid as an impurity easily from the liquid that is obtained by neutralization and contains sulfuric acid ions by 2,000 mg/L or more. It is possible to realize this by supplying carbonate ions by a predetermined amount or more to the liquid obtained by neutralization.

<<Ion Adsorption Removing Step>>

The method for recovering a valuable substance of the present invention may further include an ion adsorption removing step using either or both of an anion exchange resin or a cation exchange resin after the neutralizing step or the calcium solidification removing step described above or the preparatory concentration step described below. Of these steps, the step of adsorbing calcium to a resin and removing calcium using a cation exchange resin is referred to as a "calcium adsorption removing step". When the neutralizing step is performed over multiple stages, the method may include the ion adsorption removing step after neutralization to each pH, and may again perform neutralization to the next pH after the ion adsorption removing step. For example, a filtrate obtained by first solid-liquid separation performed after first neutralization to pH of 9 may be subjected to ion adsorption removing using an ion exchange resin, and the liquid obtained by the ion adsorption removing step may be subjected to pH elevation to pH of 12 (second neutralization) and may be subsequently subjected to second solid-liquid separation.

A plurality of kinds of ion adsorption resins and ion adsorption resin columns may be used in the ion adsorption removing steps.

By bringing an anion exchange resin into contact with the liquid obtained by neutralization or the liquid from which calcium has been removed by solidification or the liquid from which cations have been removed by adsorption, it is possible to adsorb residual trace fluorine ions and sulfuric acid ions present in the liquid obtained by neutralization or the liquid obtained by solution purification to the anion exchange resin and remove them.

When a strongly basic anion exchange resin is used, pH of the liquid from which anions have been removed by adsorption increases through the ion exchange. This makes it possible to save the amount of a neutralizer for increasing pH.

When not subjecting the liquid obtained by the neutralizing step to the calcium solidification removing step, the calcium adsorption removing step using a cation exchange resin is performed. By bringing a cation exchange resin into contact with the liquid obtained by neutralization or with the liquid obtained by solution purification, it is possible to adsorb residual trace calcium ions present in the liquid obtained by neutralization or the liquid obtained by solution purification to the cation exchange resin and remove them. In this way, the calcium grade in lithium carbonate described below can be better reduced. Particularly, when cation exchange resin adsorption is applied to the liquid obtained by neutralization, $Ca^{2+}$ ions are removed (or a liquid from which Ca has been removed by adsorption is obtained) without supplying of $CO_3^{2-}$ ion. Hence, $CO_3^{2-}$ ions are not to be kept dissolved in the liquid from which Ca has been removed by adsorption. This makes it possible to concentrate the liquid from which Ca has been removed by adsorption to a lithium concentration higher than 5,000 mg/L without precipitating lithium carbonate (i.e., lithium ions (cations) do not adsorb to the cation exchange resin). This can avoid trouble (for example, precipitation of lithium carbonate on an ion exchange membrane or clogging) due to preparatory concentration described below, and can realize a high concentration magnification. Moreover, because the lithium concentration can be increased before the lithium carbonate crystallizing step, it is possible to save the costs and time to be spent on recovery of lithium carbonate in the lithium carbonate recovering step.

In the present invention, slaked lime is used for neutralization. Therefore, the calcium ion concentration in the liquid obtained by neutralization can be suppressed to 1,000 mg/L or lower. Hence, the amount of the cation exchange resin used per unit amount of the liquid obtained by neutralization is low, and it is possible to remove calcium using the cation exchange resin at low costs (economically). For removing calcium ions, the calcium adsorption removing step is more accurate than the calcium solidification removing step, and can refine Li carbonate with a lower Ca grade.

It is preferable to subject the liquid from which cations have been removed by adsorption to preparatory concentration by electrodialysis before the calcium adsorption removing step or after the calcium adsorption removing step.

<<Preparatory Concentration Step>>

The method for recovering a valuable substance of the present invention may further include a preparatory concentration step of concentrating lithium in the solution after the neutralizing step, the calcium solidification removing step, or the ion exchange adsorption removing step. When the method includes the preparatory concentration step, for example, lithium contained in the solution can be easily crystallized in the form of lithium carbonate in the lithium carbonate crystallizing step.

The concentration method in the preparatory concentration step is not particularly limited and may be appropriately selected in accordance with the intended purpose. Examples of the concentration method include evaporative concentration, electrodialysis (ion exchange membrane method), vacuum concentration, and membrane concentration using, for example, a nano filtration (NF) membrane or a reverse osmosis (RO) membrane. Among these concentration methods, evaporative concentration or electrodialysis is preferable.

When evaporative concentration is employed, it is possible to save costs by, for example, utilizing plant waste heat, and to save initial costs for equipment because no vacuum equipment is necessary. It is also possible to effect crystallization of lithium carbonate by heating described below simultaneously during concentration, and to simplify the process.

When a step of supplying carbonate ions (for example, addition of sodium carbonate and a $CO_2$ gas) is not performed before the preparatory concentration step, it is preferable to concentrate lithium in the preparatory concentration step until the lithium concentration in the liquid becomes 4,000 mg/L or higher. When carbonate ions are supplied before the preparatory concentration step, the upper limit of the lithium concentration by the preparatory concentration is preferably 5,000 mg/L. This is because $CO_3^{2-}$ ions are kept dissolved in the target liquid of the preparatory concentration and there is a risk that loss in the form of lithium carbonate may occur by precipitation during the preparatory concentration.

The concentration magnification for the preparatory concentration of the lithium-containing solution is not particularly limited, may be appropriately selected in accordance with the intended purpose, and is preferably higher than or equal to 1.5 times but lower than or equal to 100 times, more preferably higher than or equal to 3 times but lower than or equal to 50 times, and particularly preferably higher than or equal to 5 times but lower than or equal to 10 times. When the concentration magnification is higher than 100 times, lithium sulfate or lithium fluoride may precipitate in the preparatory concentration device during the preparatory concentration.

The temperature of the lithium-containing solution during the preparatory concentration is preferably 80° C. or higher and 105° C. or lower when employing evaporative concentration.

For improving the speed of lithium carbonate recovery, it is preferable to perform the preparatory concentration by electrodialysis. Compared with the evaporative concentration, concentration by electrodialysis can increase the lithium carbonate production speed to five times or more higher using equipment of the same scale.

<<Lithium Carbonate Crystallizing Step>>

In the lithium carbonate crystallizing step, lithium carbonate is selectively crystallized and recovered, utilizing the difference in solubility between lithium carbonate and other lithium salts (for example, lithium sulfate and lithium fluoride).

Examples of the method for crystallizing lithium carbonate include (1) a method of heating the liquid from which calcium has been removed by solidification (or the lithium solution in which $CO_3^{2-}$ ions are kept dissolved) to decrease the solubility of lithium carbonate and selectively crystallize lithium carbonate (among the $CO_3^{2-}$ ions that have been supplied in the calcium solidification removing step, any $CO_3^{2-}$ ions that have been left unused for removing $Ca^{2+}$ ions can be used for crystallizing lithium carbonate in the liquid that has been through the calcium solidification removing step), (2) a method of adding carbon dioxide to the liquid from which calcium has been removed by adsorption while heating the liquid, to decrease the solubility of lithium carbonate and selectively crystallize lithium carbonate, (3) a method of adding carbon dioxide to the lithium solution, of which lithium concentration has been increased in the preparatory concentration step, while not heating the lithium solution, to precipitate lithium carbonate, and (4) a method of heating the liquid obtained by the preparatory concentration step and adding carbon dioxide, to crystallize lithium carbonate.

In the method for crystallizing and recovering lithium carbonate from the liquid from which calcium has been removed by solidification, carbon dioxide $(CO_2)$ may be added to the lithium-containing solution in the crystallizing step. This makes it easier for lithium carbonate in the lithium-containing solution to precipitate, and makes lithium carbonate precipitate faster than lithium (for example, lithium fluoride) bound with other impurities (for example, fluorine). Therefore, it is possible to recover lithium carbonate having a higher grade.

The method for adding carbon dioxide to the lithium-containing solution is not particularly limited and may be appropriately selected in accordance with the intended purpose. It is preferable to add carbon dioxide by blowing the lithium-containing solution with a carbon dioxide-containing gas or by adding a carbonate. Examples of the carbon dioxide-containing gas include air or a carbon dioxide gas. Examples of the carbonate include sodium carbonate or potassium carbonate.

The carbonate ion concentration in the lithium-containing solution to which carbon dioxide has been supplied is preferably 2 or higher relative to a lithium concentration of 1, more preferably 3 or higher relative to a lithium concentration of 1, and particularly preferably 4 or higher and 32.3 or lower relative to a lithium concentration of 1. When the carbonate ion concentration is lower than 2 relative to a lithium concentration of 1, the amount of lithium sulfate that precipitates in addition to lithium carbonate increases, and it may not be possible to crystallize lithium carbonate of an industrial grade (i.e., a lithium carbonate grade of 99.0% or higher). On the other hand, when the carbonate ion concentration is higher than 32.3, lithium carbonate may be impregnated with the liquid in which the metal derived from the carbonate added for dissolving carbonate ions is kept dissolved, and the grade of the carbonate-derived metal in lithium carbonate may be excessive.

It is preferable to continuously stir the liquid in which lithium carbonate is being crystallized. By stirring the liquid, it is possible to make the carbonate ion concentration and the impurity ion (for example, fluorine ion and sulfuric acid ion) concentrations in the liquid uniform, to make the particle diameter of the lithium carbonate precipitate uniform, and to consequently suppress generation of impurity crystals or inclusion of the liquid into the lithium carbonate precipitate. Therefore, it is possible to reduce the impurity grades in the lithium carbonate recovered product.

For crystallizing lithium carbonate, it is optional to start or continue the crystallizing step by adding a lithium carbonate crystal previously or during the crystallization. By adding the crystal (seed crystal), it is possible to increase and homogenize the particle size of lithium carbonate to be crystallized and recovered. Therefore, it is possible to suppress the water content in the crystal and to better suppress the grades of impurities derived from water-containing components.

In the lithium carbonate crystallizing step, it is also possible to crystallize lithium carbonate by heating the liquid to higher than or equal to the temperature at which the liquid evaporates in the crystallizing step and thereby evaporatively concentrating the liquid.

The precipitated lithium (lithium carbonate) can be recovered with a publicly-known tool such as a spoon, a rake, and a scraper. The slurry containing the precipitated lithium carbonate has a low viscosity. Therefore, delivery conduits will not be clogged, and it is possible to recover the precipitated lithium by supplying the slurry to a solid-liquid separator (for example, a filter press) via a pump while stirring the slurry.

The method for heating the lithium-containing solution is not particularly limited and may be appropriately selected in accordance with the intended purpose. Examples of the method include a method of heating the lithium-containing solution with an electrothermal heater, or a delivery conduit that is formed of, for example, copper, stainless steel, or Teflon (registered trademark) and through which a heated vapor passes.

For example, the temperature of the lithium-containing liquid when heating the liquid and precipitating lithium carbonate is not particularly limited and may be appropriately selected in accordance with the intended purpose so long as the temperature is a temperature at which lithium carbonate can be precipitated. For example, the temperature is preferably 60° C. or higher and 105° C. or lower.

It is optional to supply hot water to the recovered lithium carbonate and wash the Li carbonate (or rinse the Li carbonate with hot water). A sulfuric acid content included in the lithium carbonate recovered in the present invention is derived not from the crystal (lithium sulfate) but from sulfuric acid ions contained in the water content of the lithium carbonate. Therefore, it is possible to remove the sulfuric acid content by rinsing with hot water, and this can better reduce the sulfuric acid grade. The temperature of the hot water is preferably 70° C. or higher and more preferably 90° C. or higher. As the temperature of the hot water is higher, it is possible to better suppress the amount of lithium carbonate to be dissolved in the hot water and to better suppress lithium loss into the hot water.

The liquid (post-crystallization liquid) that is obtained by crystallization and from which lithium carbonate has been recovered contains lithium ions, fluorine ions, and sulfuric acid ions. By processing this liquid repeatedly through the neutralizing step, it is possible to better improve the recovery rate of lithium.

First Embodiment

Examples of the embodiments of the method for recovering a valuable substance of the present invention will be described with reference to the drawings. FIG. 1 is a diagram illustrating an example of the flow of the processes according to the first embodiment of the method for recovering a valuable substance of the present invention.

First, a lithium ion secondary battery (LIB) is thermally treated (thermal treatment step), to obtain a LIB thermally treated product.

Next, the LIB thermally treated product is pulverized and classified (pulverizing/classifying step), to obtain a coarse-grained product and a fine-grained product. Here, for example, copper (Cu) or iron (Fe) can be separated as the coarse-grained product.

Next, the fine-grained product is immersed in water, to obtain a water-leached slurry. Here, lithium (lithium oxide or lithium carbonate) is leached into the water, and a residue containing nickel (Ni), cobalt (Co), and manganese (Mn) is formed in the water-leached slurry.

Next, the water-leached slurry is subjected to wet magnetic sorting, to sort the water-leached slurry into magnetically attractable materials and a slurry of non-magnetically attractable materials. The magnetically attractable materials contain nickel (Ni), cobalt (Co), and manganese (Mn) integrated with cobalt.

The slurry of the non-magnetically attractable materials contains lithium aluminate ($LiAlO_2$), carbon, copper (copper that failed to be recovered into the coarse-grained product), and lithium (water-soluble).

Next, an acid is added to the slurry of the non-magnetically attractable materials, to leach lithium contained in lithium aluminate contained in the non-magnetically attractable materials into the acid (acid leaching step), and solid-liquid separation is subsequently performed, for solid-liquid separation into a filtrate (an acid leaching liquid) and a filtration residue (a carbon concentrate).

Next, calcium hydroxide ($Ca(OH)_2$; slaked lime) is added to the acid leaching liquid to neutralize the acid leaching liquid (neutralizing step), and solid-liquid separation is performed by filtration with a filter press, for separation into a lithium-containing liquid (a liquid obtained by neutralization) and a solidified product containing impurities such as fluorine or aluminum. Sodium carbonate ($Na_2CO_3$) is added to the liquid obtained by neutralization, and solid-liquid separation is performed by filtration with a filter press, to separate calcium kept dissolved in the liquid obtained by neutralization in the form of a solidified product as calcium carbonate (calcium solidification removing step). The lithium-containing liquid (the liquid from which calcium has been removed by solidification) is heated and evaporatively concentrated, to recover lithium in the form of lithium carbonate ($Li_2CO$).

In the first embodiment, the lithium ion secondary battery is thermally heated, and pulverized and classified to obtain a fine-grained product, the fine-grained product is immersed in water to obtain a water-leached slurry the water-leached slurry is subjected to wet magnetic sorting to obtain a slurry of non-magnetically attractable materials, sulfuric acid is added to the slurry of the non-magnetically attractable materials to perform acid leaching, and solid-liquid separation is subsequently performed with a filter press. In this way a high-grade carbon (C) concentrate having a carbon (C) grade of 80% or higher can be recovered from the lithium ion secondary battery.

Next, calcium hydroxide is added to the acid leaching liquid, and solid-liquid separation is subsequently performed with a filter press, to obtain a liquid that is obtained by neutralization and in which the fluorine concentration is decreased, and a neutralization cake containing calcium fluoride.

Next, sodium carbonate is added to the liquid obtained by neutralization, and solid-liquid separation is performed with a filter press, to obtain a liquid from which calcium has been removed by solidification and in which the calcium concentration is decreased, and a residue containing calcium carbonate.

Next, in the lithium carbonate crystallizing step, the liquid from which calcium has been removed by solidification is evaporatively concentrated by 5 times at normal pressure, and solid-liquid separation is subsequently performed with a filter press, to obtain lithium carbonate (first crystallization), and a post-crystallization liquid.

The obtained post-crystallization liquid is fed by is total amount to the neutralizing step together with an acid leaching liquid newly recovered, and subjected to the processes from the neutralizing step to the evaporative concentration step in the same manners as described above, to recover lithium carbonate (second).

Second Embodiment

Figure 2:
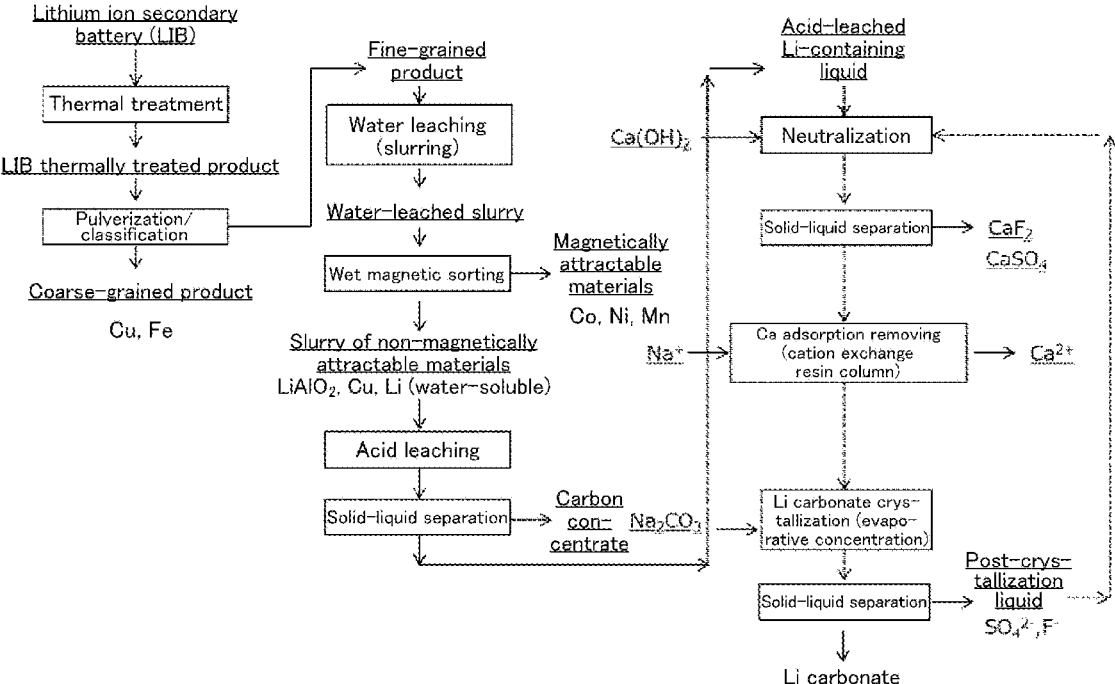
FIG. 2 is a diagram illustrating an example of a flow of processes according to a second embodiment of a method for recovering a valuable substance of the present invention.

FIG. 2 is a diagram illustrating an example of the flow of the processes according to the second embodiment of the method for recovering a valuable substance of the present invention. Description of any matters of the second embodiment that are the same as in the first embodiment will be skipped.

In the method for recovering a valuable substance according to the second embodiment, an acid leaching liquid is neutralized by addition of calcium hydroxide ($Ca(OH)_2$; slaked lime) in the same manner as in the first embodiment, to remove F and Al.

Next, the liquid obtained by neutralization is passed through a cation exchange resin column, to adsorb and remove $Ca^{2+}$ ions (calcium adsorption removing step).

Next, the liquid from which Ca has been removed by adsorption is evaporatively concentrated in the same manner as in the first embodiment, to recover lithium in the form of lithium carbonate ($Li_2CO_3$) (first). The obtained post-crystallization liquid is fed by its total amount to the neutralizing step together with an acid leaching liquid newly recovered, and subjected to the processes from the neutralizing step to the evaporative concentration step in the same manners as described above, to recover lithium carbonate (second).

Third Embodiment

Figure 3:
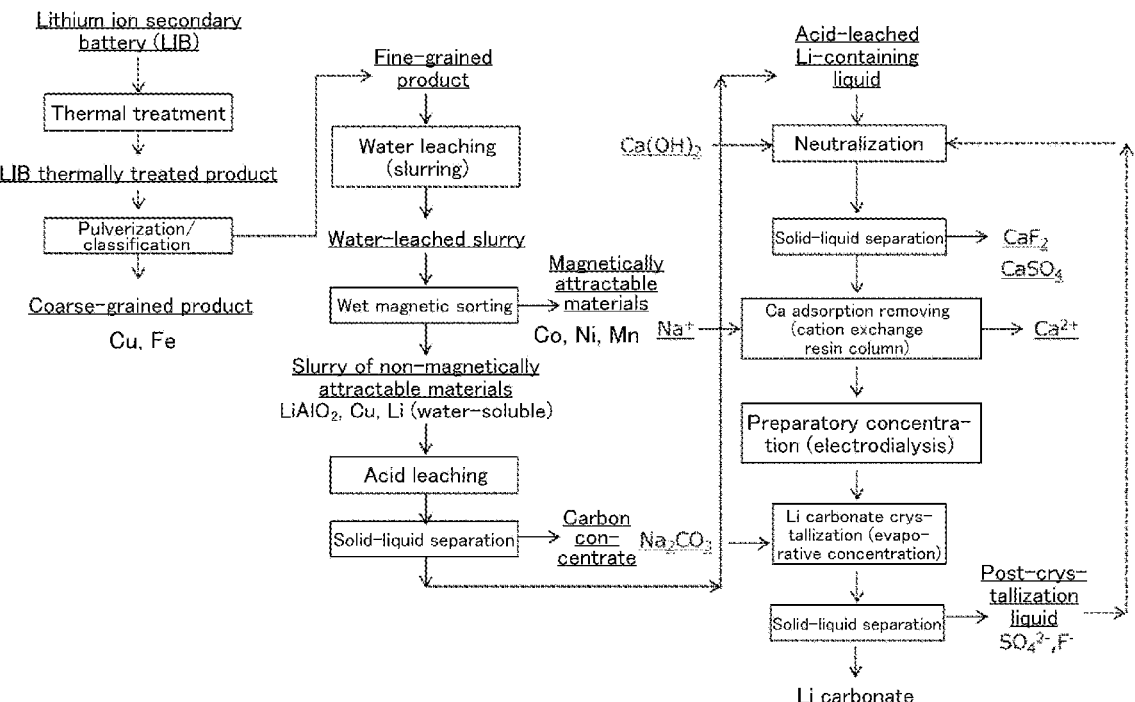
FIG. 3 is a diagram illustrating an example of a flow of processes according to a third embodiment of a method for recovering a valuable substance of the present invention.

FIG. 3 is a diagram illustrating an example of the flow of the processes according to the third embodiment of the method for recovering a valuable substance of the present invention. Description of any matters of the third embodiment that are the same as in the first embodiment will be skipped.

In the method for recovering a valuable substance according to the third embodiment, an acid leaching liquid is neutralized by addition of calcium hydroxide ($Ca(OH)_2$; slaked lime) in the same manner as in the first embodiment, to remove F and Al.

Next, the liquid obtained by neutralization is passed through a cation exchange resin column, to adsorb and remove $Ca^{2+}$ ions (calcium adsorption removing step) in the same manner as in the second embodiment.

Next, the liquid from which Ca has been removed by adsorption is subjected to non-heating concentration by electrodialysis (ion exchange membrane method) until the Li concentration becomes from 1,500 mg/L through 7,500 mg/L.

Next, in the lithium carbonate crystallizing step, while stirring the obtained Li-concentrated liquid in a stirring tank, sodium carbonate is added to the Li-concentrated liquid, to precipitate Li carbonate (first). The slurry containing Li carbonate is subjected to solid-liquid separation with a filter press. The obtained post-crystallization liquid is fed by its total amount to the neutralizing step together with an acid leaching liquid newly recovered, and subjected to the processes from the neutralizing step to the evaporative concentration step in the same manners as described above, to recover lithium carbonate (second).

EXAMPLES

The present invention will be described below by way of Examples. The present invention should not be construed as being limited to these Examples.

Example 1

<Thermal Treatment>

A lithium ion secondary battery pack (300 kg) for vehicles, of which exterior case (housing) was formed of aluminum (with some parts of the exterior case containing iron) (in the lithium ion secondary battery the positive electrode current collector was an aluminum foil, the negative electrode current collector was a copper foil, the negative electrode active substance was a carbon material, and the electrolytic solution contained fluorine) was subjected to the thermal treatment step, the pulverizing step, the classifying step, the magnetic sorting step, and the wet magnetic sorting step as indicated by the process flow of FIG. 2, to recover a valuable substance. Specific processes were as follows.

Using a fixed bed furnace (having a diameter of 4,300 mm and a height of 6,500 mm) having a cylindrical internal shape as a thermal treatment device, the lithium ion secondary battery pack was thermally treated at a thermal treatment temperature of 800° C. (subjected to temperature elevation from 20° C. to 800° C. in 15 minutes, and then temperature retention for 2 hours) in the atmospheric atmosphere. In the thermal treatment, the lithium ion secondary battery pack for vehicles was placed on a receptacle for recovering aluminum derived from the housing, and aluminum derived from the housing was melted and recovered in the receptacle as a melt.

<Pulverization and Classification>

Next, in the pulverizing step, using a hammer crasher (MAKINO-TYPE SWING HAMMER CRUSHER HC-20-3.7, obtained from Makino Mfg. Co., Ltd.) as a pulverizer, the lithium ion secondary battery having been subjected to the heating treatment was pulverized at 50 Hz (at a hammer circumferential speed of 38 m/s) with a punching metal hole diameter of 10 mm at the outlet, to obtain a pulverized product of the lithium ion secondary battery.

Next, using a sieve having a mesh size of 1.2 mm (with a diameter of 200 mm, obtained from Tokyo Screen Co., Ltd.), the pulverized product of the lithium ion secondary battery was sieved. After classification, the oversize product (coarse-grained product) and the undersize product (fine-grained product) above and below the 1.2 mm sieve were harvested, respectively. The amount of Li loss into the coarse-grained product when the amount of Li contained in the lithium ion secondary battery was seen to be 100% was 1%, and 99% of Li was successfully recovered into the fine-grained product.

<Water Leaching and Soli-Liquid Separation>

Sixty two point five kilograms of the obtained fine-grained product was immersed in water (250 L), to leach lithium into water at a solid-liquid ratio of 25% at a stirring speed of 400 rpm for a leaching time of 1 hour, to obtain a water-leached slurry.

<Wet Magnetic Sorting>

Using a drum-shaped magnetic sorter (product name: WD L-8 LABORATORY MODEL, obtained from Eriez Magnetics Japan Co., Ltd.), the obtained water-leached slurry was subjected to wet magnetic sorting at a magnetic force of 1,500 G at a drum rotation number of 45 rpm at a solid-liquid ratio of 25% at a slurry supplying speed of 100 L/h/min, to recover magnetically attractable materials (containing water) and a slurry of non-magnetically attractable materials (250 L). The magnetically attractable materials (containing water) were subjected to pressure filtration at a pressure of 0.6 MP with a filter press using a filter cloth (product name: PP934K, obtained from Nakao Filter Media Corp.), to obtain magnetically attractable materials (dehydrated). The magnetically attractable materials (dehydrated) were dried with a drier (product name: DRM620DD, obtained from Advantec Toyo Kaisha, Ltd.) at 105° C. for 24 hours, to obtain the magnetically attractable materials.

<Acid Leaching>

The slurry of the non-magnetically attractable materials (250 L) was subjected to acid leaching by sulfuric acid. Dilute sulfuric acid having a concentration of 20% and water were added to the slurry of the non-magnetically attractable materials in a polyethylene tank (product name: Y-1000, obtained from Dailite Co., Ltd.) having a capacity of 1,000 L, to produce a liquid (400 L) adjusted to pH of 2.0 (the liquid containing a residue). The liquid was stirred using a stirrer (product name: SUPER AGITATOR, model No. TTF-2V obtained from Toyoki Corporation) at a stirring speed of 200 rpm for 1 hour, to leach lithium. After the acid leaching, the leached slurry was subjected to pressure filtration at a pressure of 0.6 MP with a filter press using a filter cloth (product name: PP934K, obtained from Nakao Filter Media Corp.), to recover an acid leaching liquid containing Li. Water (30 L) was passed through the acid leaching residue (30 kg) in the filter press, to wash the acid leaching residue, and subsequently recover the residue as a carbon concentrate.

<Neutralization>

The obtained acid leaching liquid was prepared in an FRP tank (a manufactured product with a diameter of 1,084 mm and a height of 1,500 mm). While the resultant was being stirred with a stirrer (HP-5006, obtained from HANWAKA-KOKI Co., Ltd.), slaked lime having a slurry concentration of 25% and water were added to adjust pH to 12.0 for neutralization for 1 hour, and solid-liquid separation was subsequently performed by pressure filtration at a pressure of 0.6 MPa with a filter press using a filter cloth (product name: PP934K, obtained from Nakao Filter Media Corp.), to obtain a Li solution (a liquid obtained by neutralization) from which F, Al, and $SO_4$ were removed.

<Calcium Solidification Removing>

The liquid obtained by neutralization (885 L) was prepared in an FRP tank (a manufactured product with a diameter of 1,084 mm and a height of 1,500 mm). Sodium carbonate (13 g/L) was added, and the resultant was stirred with a stirrer (HP-5006, obtained from HANWAKAKOKI Co., Ltd.) for 30 minutes. Pressure filtration was subsequently performed at a pressure of 0.6 MPa with a filter press using a filter cloth (product name: PP934K, obtained from Nakao Filter Media Corp.), to obtain a liquid from which calcium had been removed by solidification.

<Crystallization of Lithium Carbonate>

The liquid from which calcium had been removed by solidification (880 L) was prepared first by 200 L in a 250 L SUS304 cylindrical container (a manufactured product with an internal diameter of 650 mm and a height of 1,180 mm), and subsequently continuously supplied thereinto at a rate of 7 L/hour while being stirred at stirring speed of 200 rpm with a stirrer (product name: SUPER AGITATOR, model No. TTF-2V, obtained from Toyoki Corporation). A vapor having a temperature of 158° C. was supplied into a Teflon (registered trademark) tube-type heat exchanger (obtained from Kansetsu Sangyo Co., Ltd., a manufactured product with a heat transfer area of 1.4 m²) installed within the container, for heat exchange of the liquid in a manner that the liquid temperature would be 100° C. Next, the resultant was evaporatively concentrated by 5 times at normal pressure (in a manner that the liquid obtained by the evaporative concentration (the liquid containing a Li carbonate crystallized product) would have a volume of 174 L), and the liquid obtained by the evaporative concentration was subjected to pressure filtration at a pressure of 0.6 MPa with a filter press using a filter cloth (product name: PP934K, obtained from Nakao Filter Media Corp.), to obtain a lithium carbonate crystallized product (first) and a post-crystallization liquid. A liquid in which the obtained post-crystallization liquid was mixed by its total amount (170 L) with a new acid leaching liquid (400 L) was produced, and subjected to the processes from the neutralizing step to the lithium carbonate crystallizing step in the same manners as in the first production of the lithium carbonate crystallized product, to obtain a lithium carbonate crystallized product (second).

<Evaluation of Grade and Recovery Rate>

The masses of the fine-grained product, the magnetically attractable materials, the carbon concentrate (acid leaching residue), and lithium carbonate were measured using an electromagnetic balance (product name: GX-8K, obtained from A&D Company Limited) after they were dried at 105° C. for 1 hour. Subsequently the leaching residue was heated and dissolved in aqua regia (obtained from FUJIFILM Wako Pure Chemical Corporation), and analyzed by an inductively coupled high-frequency plasma emission spectrometer (ICAP6300, obtained from Thermo Fisher Scientific K.K.), to obtain the content ratios (grades) of impurities other than fluorine in the fine-grained product, the magnetically attractable materials, the carbon concentrate, and lithium carbonate in a manner that impurities that were lost by ignition loss would not be counted in.

The fluorine grade was analyzed by an ion chromatograph method based on JIS K0202:2008. The grade analyzing results of the fine-grained product and the magnetically attractable materials are presented in Table 1 (these results are common to Examples 1 to 7 and Reference Examples 1 to 4).

The grade analyzing results of the carbon concentrate is presented in Table 2.

The distribution ratios of the respective elements into the magnetically attractable materials, the acid leaching residue (carbon concentrate), and the acid leaching liquid when the contents of the respective elements in the fine-grained product were seen to be 100% are presented in Table 3. The quality of the recovered lithium carbonate (first crystallized product) is presented in Table 16.

The composition of the filtrate after each solid-liquid separation was analyzed by an inductively coupled high-frequency plasma emission spectrometer (ICAP6300, obtained from Thermo Fisher Scientific K.K.) except for F and $SO_4$. The fluorine ion concentration and the sulfuric acid ion concentration were measured by an ion chromatography measuring instrument (product name: DIONEX INTEGRION RFIC, obtained from Thermo Fisher Scientific K.K.).

The composition of the acid leaching liquid is presented in Table 4. The leaching ratios (%) with respect to the contents (100%) in the fine-grained product are presented in Table 5. The compositions of the liquid obtained by neutralization and the liquid from which calcium had been removed by solidification are presented in Table 6.

The amounts of lithium in the liquids obtained by the respective steps when the amount of lithium contained in the fine-grained product was seen to be 100% are presented in Table 15.

Example 2

Magnetically attractable materials, a carbon concentrate (acid leaching residue), and lithium carbonate were recovered in the same manner as in Example 1, except that unlike in Example 1, acid leaching of a slurry of non-magnetically attractable materials was performed at pH of 1.0. The results of Example 2 are presented in Tables 1 to 5 and Tables 15 and 16.

Example 3

Magnetically attractable materials, a carbon concentrate (acid leaching residue), and lithium carbonate were recovered in the same manner as in Example 1, except that unlike in Example 1, acid leaching of a slurry of non-magnetically attractable materials was performed at pH of 3.0. The results of Example 3 are presented in Tables 1 to 5 and Tables 15 and 16.

Example 4

A slurry of non-magnetically attractable materials obtained by performing the same processes as in Example 1 was subjected to solid-liquid separation into a filtrate (water leaching liquid) (250 L) and non-magnetically attractable materials (30 kg). The non-magnetically attractable materials were added to water (60 L), and the resultant was subsequently stirred for 2 hours at 200 rpm at pH of 2 with addition of 20% sulfuric acid and water. The resultant was subjected to solid-liquid separation, to obtain an acid leaching liquid (150 L) and an acid leaching residue (carbon concentrate). A mixture liquid (400 L), in which the acid leaching liquid and the water leaching liquid were mixed, was obtained. This mixture liquid was subjected to the neutralizing step and the subsequent steps of Example 1. The results of Example 4 are presented in Tables 1 to 5 and 7, and Tables 15 and 16.

Example 5

The same processes as in Example 1 were performed until a liquid obtained by neutralization was produced. Subsequently calcium adsorption removing described below was performed, and sodium carbonate (13 g/L) was added to the obtained liquid from which calcium was removed by adsorption. Subsequently lithium carbonate was crystallized in the same manner as in Example 1, to obtain a lithium carbonate crystallized product. The results of Example 5 are presented in Tables 1 to 5 and 8, and Tables 15 and 16.

<Calcium Adsorption Removing>

The liquid obtained by neutralization was passed through a cation exchange resin column (product name: DUOLITE C20SC, obtained from Sumika Chemtex Co., Ltd.) at SV (space velocity) of 1, to obtain a liquid (870 L) from which calcium had been removed by adsorption.

Example 6

The same processes as in Example 5 were performed until calcium was removed by adsorption. Subsequently, preparatory concentration and crystallization of lithium carbonate described below were performed. The results of Example 6 are presented in Tables 1 to 5 and 9, and Tables 15 and 16.

<Preparatory Concentration>

The liquid (875 L) from which calcium had been removed by adsorption was concentrated by 5 times using an electrodialysis device (AC-10, obtained from ASTOM Corporation) (a liquid obtained by preparatory concentration was obtained by 175 L).

<Crystallization of Lithium Carbonate>

Sodium carbonate (13 g/L) was added to the liquid obtained by preparatory concentration under a non-heating condition, and the resultant was stirred for 1 hour and subsequently subjected to solid-liquid concentration, to obtain a lithium carbonate crystallized product (first) and a post-crystallization liquid. A liquid in which the obtained post-crystallization liquid (170 L) was mixed with a new acid leaching liquid (400 L) was produced, and subjected to the processes from the neutralizing step to the lithium carbonate crystallizing step in the same manners as in the production of the first lithium carbonate crystallized product, to obtain a lithium carbonate crystallized product (second).

Example 7

The processes until after preparatory concentration were performed in the same manners as in Example 6, and crystallization of lithium carbonate described below was subsequently performed. The results of Example 7 are presented in Tables 1 to 5 and 10, and Tables 15 and 16.

<Crystallization of Lithium Carbonate>

Using the 250 L SUS container and the Teflon (registered trademark) tube-type heat exchanger used in Example 1, the liquid obtained by preparatory concentration was heated to 100° C. while being stirred, sodium carbonate (13 g/L) was added. The resultant was stirred for 1 hour, and subsequently subjected to solid-liquid separation, to obtain a lithium carbonate crystallized product (first) and a post-crystallization liquid. A liquid in which the obtained post-crystallization liquid (170 L) was mixed with a new acid leaching liquid (400 L) was produced, and subjected to the processes from the neutralizing step to the lithium carbonate crystallizing step in the same manners as in the production of the first lithium carbonate crystallized product, to obtain a lithium carbonate crystallized product (second).

Comparative Example 1

An acid leaching residue was recovered in the same manner as in Example 1, except that unlike in Example 1, a water-leached slurry before wet magnetic sorting was used as a sample, i.e., the wet magnetic sorting step was not performed.

The content ratios (grades) of the respective impurities in the obtained carbon concentrate were measured in the same manner as in Example 1. The results are presented in Table 2.

Comparative Example 2

Filtration residues were recovered from magnetically attractable materials and a slurry of non-magnetically attractable materials in the same manner as in Example 1, except that unlike in Example 1, the acid leaching step was not performed.

The content ratios (grades) of the respective impurities in the obtained filtration residues were measured in the same manner as in Example 1. The results are presented in Table 2 and Tables 4 and 5.

Comparative Example 3

Magnetically attractable materials and an acid leaching residue were recovered in the same manner as in Example 1, except that unlike in Example 1, acid leaching of a slurry of non-magnetically attractable materials was performed at pH of 4.0. For an acid leaching liquid, a neutralization test and a Ca solidification removing test were performed, to recover a liquid obtained by neutralization and a liquid from which calcium had been removed by solidification and analyze their compositions.

The content ratios (grades) of the respective impurities in the obtained magnetically attractable materials and non-magnetically attractable materials were measured in the same manner as in Example 1. The results are presented in Tables 2, 4, 5, and 15.

Reference Example 1

Magnetically attractable materials, a carbon concentrate, and lithium carbonate were recovered in the same manner as in Example 1, except that unlike in Example 1, the calcium solidification removing step was not performed, and that solidum carbonate (13 g/L) was added and evaporative concentration was subsequently started in the lithium carbonate crystallizing step. The results of Reference Example 1 are presented in Tables 1 to 5 and 11, and Tables 15 and 16.

Reference Example 2

Magnetically attractable materials, a carbon concentrate, and lithium carbonate were recovered in the same manner as in Example 1, except that unlike in Example 1, a carbon dioxide gas was used in the calcium solidification removing step. The results of Reference Example 2 are presented in Tables 1 to 5 and 12, and Tables 15 and 16.

Reference Example 3

Magnetically attractable materials, a carbon concentrate, and lithium carbonate were recovered in the same manner as in Example 1, except that unlike in Example 1, a liquid obtained by neutralization was evaporated at 60° to adjust the lithium concentration in the liquid obtained by neutralization to 6,008 mg/L (i.e., to concentrate the liquid by 4 times), that sodium carbonate was added to this liquid by 52 g/L (i.e., a concentration four times higher than in Example 1) to perform the calcium solidification removing step, and that the evaporative concentration magnification in the lithium carbonate crystallizing step was changed to 1.25 times. The results of Reference Example 3 are presented in Tables 1 to 5 and 13, and Tables 15 and 16.

Reference Example 4

In Example 4, an acid leaching liquid was subjected to the neutralizing step and the subsequent steps of Example 1. The results of Reference Example 4 are presented in Tables 1 to 5 and Tables 14 to 16.

TABLE 1

| Grades in fine grained product and magnetically attractable materials | | | Ex. 1 to 7 and Ref. Ex. 1 to 4 | |
| --- | --- | --- | --- | --- |
| | | | Fine-grained product | Magnetically attractable materials |
| Weight | | (kg) | 62.5 | 32.5 |
| Grade | Li | (wt. %) | 3.5 | 2.3 |
| | Co | (wt. %) | 12.0 | 21.0 |
| | Ni | (wt. %) | 12.2 | 21.5 |
| | Mn | (wt. %) | 11.2 | 17.9 |
| | Cu | (wt. %) | 1.1 | 0.4 |
| | Al | (wt. %) | 7.2 | 5.5 |
| | Fe | (wt. %) | 0.1 | 0.2 |
| | Zn | (wt. %) | 0.0 | 0.0 |
| | C | (wt. %) | 28.2 | 9.9 |
| | P | (wt. %) | 0.5 | 0.1 |
| | F | (wt. %) | 4.0 | 4.7 |
| | Na | (wt. %) | 0.0 | 0.0 |
| | Ca | (wt. %) | 0.0 | 0.0 |
| | $SO_4$ | (wt. %) | 0.0 | 0.0 |

From the results of Table 1, it was revealed that in Examples 1 to 7 and Reference Examples 1 to 4, it was possible to recover Co and Ni concentrates both having Co and Ni grades of 20% or higher as the magnetically attractable materials.

TABLE 2

| | Grade in carbon concentrate | | | | | | |
| --- | --- | --- | --- | --- | --- | --- | --- |
| | Ex. 1, 5 to 7, and Ref. Ex. 1 to 3 (wt. %) | Ex. 2 (wt. %) | Ex 3 (wt. %) | Ex. 4, and Ref. Ex. 4 (wt. %) | Comp. Ex. 1 (wt. %) | Comp. Ex. 2 (wt. %) | Comp. Ex. 3 (wt. %) |
| C | 93.7 | 95.0 | 90.0 | 93.6 | 70.2 | 73.4 | 78.7 |
| Li | 0.0 | 0.0 | 0.6 | 0.0 | 0.1 | 3.1 | 2.5 |
| Co | 0.4 | 0.2 | 0.4 | 0.5 | 9.8 | 2.9 | 2.0 |
| Ni | 0.7 | 0.5 | 0.8 | 0.7 | 11.0 | 2.9 | 2.0 |
| Mn | 0.0 | 0.0 | 0.0 | 0.0 | 7.2 | 3.4 | 1.7 |
| Cu | 3.6 | 3.3 | 3.5 | 3.5 | 1.5 | 2.8 | 2.5 |
| Al | 1.5 | 0.9 | 3.8 | 1.7 | 0.2 | 6.6 | 6.4 |
| Fe | 0.0 | 0.1 | 0.1 | 0.0 | 0.0 | 0.2 | 0.2 |
| P | 0.0 | 0.0 | 0.4 | 0.0 | 0.0 | 0.6 | 0.5 |
| Na | 0.0 | 0.0 | 0.0 | 0.0 | 0.0 | 0.0 | 0.0 |
| Ca | 0.0 | 0.0 | 0.0 | 0.0 | 0.0 | 0.0 | 0.0 |
| F | 0.0 | 0.0 | 0.5 | 0.0 | 0.0 | 4.0 | 3.5 |
| $SO_4$ | 0.0 | 0.0 | 0.0 | 0.0 | 0.0 | 0.0 | 0.0 |

TABLE 3

| | Ex. 1 to 7, and Ref. Ex. 1 to 4 | | | | |
| --- | --- | --- | --- | --- | --- |
| | Fine-grained product (%) | Magnetically-attractable materials (%) | Carbon concentrate (%) | Acid leaching liquid (%) | |
| C | 100 | 18 | 82 | 0 | 55 |
| Co | 100 | 91 | 6 | 3 | |
| Ni | 100 | 91 | 6 | 3 | 60 |
| Li | 100 | 34 | 0 | 66 | |
| Mn | 100 | 83 | 7 | 10 | |
| Cu | 100 | 18 | 82 | 0 | |
| Al | 100 | 40 | 38 | 22 | |
| Fe | 100 | 76 | 0 | 24 | 65 |

From the results of Table 3, the recovery rates of Co and Ni in the magnetically attractable materials were 91% or higher in all of Examples 1 to 7 and Reference Examples 1 to 4. From the results of Table 2 and Table 3, it was revealed that in Examples 1 to 7 and Reference Examples 1 to 4, it was possible to recover a carbon concentrate having a carbon grade of 90% or higher at a carbon recovery rate of 80% or higher.

TABLE 4

| | | Composition of leaching liquid | | | | | | |
|---|---|---|---|---|---|---|---|---|
| | | Ex. 1, 5 to 7, and Ref. Ex. 1 to 3 | Ex. 2 | Ex. 3 | Ex. 4 | Comp. Ex. 2 | Comp. Ex. 3 | Ref. Ex. 4 |
| Kind of leaching liquid | | Acid leaching liquid | Acid leaching liquid | Acid leaching liquid | Mixture liquid | Water leaching liquid | Acid leaching liquid | Acid leaching liquid |
| Amount of leaching liquid | (L) | 400 | 400 | 400 | 400 | 250 | 400 | 150 |
| pH | (—) | 2.0 | 1.0 | 3.0 | Not measured | 11.0 | 4.0 | 2.0 |
| Li | (mg/L) | 3,614 | 3,644 | 2,914 | 3,190 | 2,020 | 1,850 | 5,141 |
| Co | (mg/L) | 388 | 395 | 310 | 687 | 0 | 205 | 1,833 |
| Ni | (mg/L) | 388 | 396 | 311 | 680 | 0 | 206 | 1,813 |
| Mn | (mg/L) | 1,230 | 1,216 | 957 | 2,104 | 0 | 0 | 5,612 |
| Cu | (mg/L) | 0 | 0 | 0 | 0 | 0 | 0 | 0 |
| Al | (mg/L) | 2,030 | 2,106 | 609 | 3,760 | 141 | 57 | 9,791 |
| Fe | (mg/L) | 41 | 48 | 16 | 76 | 0 | 3 | 202 |
| C | (mg/L) | 0 | 0 | 0 | 0 | 0 | 0 | 0 |
| P | (mg/L) | 19 | 20 | 10 | 379 | 0 | 6 | 1,010 |
| Na | (mg/L) | 0 | 0 | 0 | 0 | 0 | 0 | 0 |
| Ca | (mg/L) | 0 | 0 | 0 | 0 | 0 | 0 | 0 |
| $F^-$ | (mg/L) | 3,204 | 3,096 | 1,699 | 3,478 | 700 | 840 | 8,107 |
| $SO_4^{2-}$ | (mg/L) | 31,500 | 37,000 | 22,000 | 30,500 | 0 | 11,500 | 81,000 |
| $CO_3^{2-}$ | (mg/L) | 0 | 0 | 0 | 0 | 8,000 | 0 | 0 |

TABLE 5

| | | | Leaching ratio relative to content (100%) in fine-grained product | | | | | | | |
|---|---|---|---|---|---|---|---|---|---|---|
| | | | Fine-grained product | Ex. 1, 5 to 7, and Ref. Ex. 1 to 3 | Ex. 2 | Ex. 3 | Ex. 4 | Comp. Ex. 2 | Comp. Ex. 3 | Ref. Ex. 4 |
| Weight | | (Kg) | 63 | 400 | 400 | 400 | 400 | 250 | 400 | 150 |
| Leaching ratio | Li | (%) | 100 | 66 | 67 | 53 | 58 | 23 | 34 | 35 |
| | Co | (%) | 100 | 2 | 2 | 2 | 4 | 0 | 1 | 4 |
| | Ni | (%) | 100 | 2 | 2 | 2 | 4 | 0 | 1 | 4 |
| | Mn | (%) | 100 | 7 | 7 | 5 | 12 | 0 | 0 | 12 |
| | Cu | (%) | 100 | 0 | 0 | 0 | 0 | 0 | 0 | 0 |
| | Al | (%) | 100 | 18 | 19 | 5 | 33 | 1 | 1 | 33 |
| | Fe | (%) | 100 | 20 | 23 | 8 | 37 | 0 | 1 | 37 |
| | F | (%) | 100 | 51 | 50 | 27 | 56 | 7 | 13 | 49 |

TABLE 6

| | | Ex. 1 | | |
|---|---|---|---|---|
| Kind of leaching liquid | | Acid leaching liquid | Liquid obtained by neutralization | Liquid from which Ca was removed by solidification |
| Amount of leaching liquid | (L) | 400 | 885 | 880 |
| pH | (—) | 2.0 | 12.9 | 12.8 |
| Li | (mg/L) | 3,614 | 1,502 | 1,495 |
| Co | (mg/L) | 388 | 0 | 0 |
| Ni | (mg/L) | 388 | 0 | 0 |
| Mn | (mg/L) | 1,230 | 0 | 0 |
| Cu | (mg/L) | 0 | 0 | 0 |
| Al | (mg/L) | 2,030 | 0 | 0 |

TABLE 6-continued

| | | Ex. 1 | | |
|---|---|---|---|---|
| Kind of leaching liquid | | Acid leaching liquid | Liquid obtained by neutralization | Liquid from which Ca was removed by solidification |
| Fe | (mg/L) | 41 | 0 | 0 |
| C | (mg/L) | 0 | 0 | 0 |
| P | (mg/L) | 19 | 0 | 0 |
| Na | (mg/L) | 0 | 0 | 5,400 |
| Ca | (mg/L) | 0 | 580 | 1 |
| $F^-$ | (mg/L) | 3,204 | 14 | 13 |
| $SO_4^{2-}$ | (mg/L) | 31,500 | 7,500 | 7,500 |
| $CO_3^{2-}$ | (mg/L) | 0 | 0 | 7,000 |

TABLE 7

| | | Ex. 4 | | |
|---|---|---|---|---|
| Kind of leaching liquid | | Mixture liquid | Liquid obtained by neutralization | Liquid from which Ca was removed by solidification |
| Amount of leaching liquid | (L) | 400 | 830 | 820 |
| pH | (—) | Not measured | 12.7 | 11.5 |
| Li | (mg/L) | 3,190 | 1,430 | 1,406 |
| Co | (mg/L) | 687 | 0 | 0 |
| Ni | (mg/L) | 680 | 0 | 0 |
| Mn | (mg/L) | 2,104 | 0 | 0 |
| Cu | (mg/L) | 0 | 0 | 0 |
| Al | (mg/L) | 3,760 | 0 | 0 |
| Fe | (mg/L) | 76 | 0 | 0 |
| C | (mg/L) | 0 | 0 | 0 |
| P | (mg/L) | 379 | 0 | 0 |
| Na | (mg/L) | 0 | 0 | 5,400 |
| Ca | (mg/L) | 0 | 390 | 1 |
| F$^-$ | (mg/L) | 3,478 | 15 | 15 |
| SO$_4$$^{2-}$ | (mg/L) | 30,500 | 7,000 | 7,000 |
| CO$_3$$^{2-}$ | (mg/L) | 0 | 0 | 7,000 |

TABLE 8

| | | Ex. 5 | | |
|---|---|---|---|---|
| Kind of leaching liquid | | Acid leaching liquid | Liquid obtained by neutralization | Liquid from which Ca was removed by solidification |
| Amount of leaching liquid | (L) | 400 | 885 | 876 |
| pH | (—) | 2.0 | 12.9 | 12.5 |
| Li | (mg/L) | 3,614 | 1,502 | 1,499 |
| Co | (mg/L) | 388 | 0 | 0 |
| Ni | (mg/L) | 388 | 0 | 0 |
| Mn | (mg/L) | 1,230 | 0 | 0 |
| Cu | (mg/L) | 0 | 0 | 0 |
| Al | (mg/L) | 2,030 | 0 | 0 |
| Fe | (mg/L) | 41 | 0 | 0 |
| C | (mg/L) | 0 | 0 | 0 |
| P | (mg/L) | 19 | 0 | 0 |
| Na | (mg/L) | 0 | 0 | 684 |
| Ca | (mg/L) | 0 | 580 | 0 |
| F$^-$ | (mg/L) | 3,204 | 14 | 13 |
| SO$_4$$^{2-}$ | (mg/L) | 31,500 | 7,500 | 7,500 |
| CO$_3$$^{2-}$ | (mg/L) | 0 | 0 | 0 |

TABLE 9

| | | Ex. 6 | | | |
|---|---|---|---|---|---|
| Kind of leaching liquid | | Acid leaching liquid | Liquid obtained by neutralization | Liquid from which Ca was removed by solidification | Liquid obtained by preparatory concentration |
| Amount of leaching liquid | (L) | 400 | 885 | 875 | 175 |
| pH | (—) | 2.0 | 12.9 | 12.5 | 13.1 |
| Li | (mg/L) | 3,614 | 1,502 | 1,499 | 7,450 |
| Co | (mg/L) | 388 | 0 | 0 | 0 |
| Ni | (mg/L) | 388 | 0 | 0 | 0 |
| Mn | (mg/L) | 1,230 | 0 | 0 | 0 |
| Cu | (mg/L) | 0 | 0 | 0 | 0 |
| Al | (mg/L) | 2,030 | 0 | 0 | 0 |
| Fe | (mg/L) | 41 | 0 | 0 | 0 |
| C | (mg/L) | 0 | 0 | 0 | 0 |
| P | (mg/L) | 19 | 0 | 0 | 0 |
| Na | (mg/L) | 0 | 0 | 684 | 3,400 |
| Ca | (mg/L) | 0 | 580 | 0 | 0 |
| F$^-$ | (mg/L) | 3,204 | 14 | 13 | 65 |
| SO$_4$$^{2-}$ | (mg/L) | 31,500 | 7,500 | 7,500 | 37,500 |
| CO$_3$$^{2-}$ | (mg/L) | 0 | 0 | 0 | 0 |

TABLE 10

| | | Ex. 7 | | | |
|---|---|---|---|---|---|
| Kind of leaching liquid | | Acid leaching liquid | Liquid obtained by neutralization | Liquid from which Ca was removed by solidification | Liquid obtained by preparatory concentration |
| Amount of leaching liquid | (L) | 400 | 885 | 875 | 175 |
| pH | (—) | 2.0 | 12.9 | 12.5 | 13.1 |
| Li | (mg/L) | 3,614 | 1,502 | 1,499 | 7,450 |
| Co | (mg/L) | 388 | 0 | 0 | 0 |
| Ni | (mg/L) | 388 | 0 | 0 | 0 |
| Mn | (mg/L) | 1,230 | 0 | 0 | 0 |

TABLE 10-continued

| | | Acid leaching liquid | Liquid obtained by neutral-ization | Liquid from which Ca was removed by solid-ification | Liquid obtained by preparatory concentra-tion |
|---|---|---|---|---|---|
| Kind of leaching liquid | | | | | |
| Cu | (mg/L) | 0 | 0 | 0 | 0 |
| Al | (mg/L) | 2,030 | 0 | 0 | 0 |
| Fe | (mg/L) | 41 | 0 | 0 | 0 |
| C | (mg/L) | 0 | 0 | 0 | 0 |
| P | (mg/L) | 19 | 0 | 0 | 0 |
| Na | (mg/L) | 0 | 0 | 684 | 3,400 |
| Ca | (mg/L) | 0 | 580 | 0 | 0 |
| F$^-$ | (mg/L) | 3,204 | 14 | 13 | 65 |
| SO$_4^{2-}$ | (mg/L) | 31,500 | 7,500 | 7,500 | 37,500 |
| CO$_3^{2-}$ | (mg/L) | 0 | 0 | 0 | 0 |

TABLE 11

Ref. Ex. 1

| Kind of leaching liquid | | Acid leaching liquid | Liquid obtained by neutralization |
|---|---|---|---|
| Amount of leaching liquid | (L) | 400 | 885 |
| pH | (—) | 2.0 | 12.9 |
| Li | (mg/L) | 3,614 | 1,502 |
| Co | (mg/L) | 388 | 0 |
| Ni | (mg/L) | 388 | 0 |
| Mn | (mg/L) | 1,230 | 0 |
| Cu | (mg/L) | 0 | 0 |
| Al | (mg/L) | 2,030 | 0 |
| Fe | (mg/L) | 41 | 0 |
| C | (mg/L) | 0 | 0 |
| P | (mg/L) | 19 | 0 |
| Na | (mg/L) | 0 | 0 |
| Ca | (mg/L) | 0 | 580 |
| F$^-$ | (mg/L) | 3,204 | 14 |
| SO$_4^{2-}$ | (mg/L) | 31,500 | 7,500 |
| CO$_3^{2-}$ | (mg/L) | 0 | 0 |

TABLE 12

Ref. Ex. 2

| Kind of leaching liquid | | Acid leaching liquid | Liquid obtained by neutralization | Liquid from which Ca was removed by solidification |
|---|---|---|---|---|
| Amount of leaching liquid | (L) | 400 | 885 | 880 |
| pH | (—) | 2.0 | 12.9 | 11.5 |
| Li | (mg/L) | 3,614 | 1,502 | 1,500 |
| Co | (mg/L) | 388 | 0 | 0 |
| Ni | (mg/L) | 388 | 0 | 0 |
| Mn | (mg/L) | 1,230 | 0 | 0 |
| Cu | (mg/L) | 0 | 0 | 0 |
| Al | (mg/L) | 2,030 | 0 | 0 |
| Fe | (mg/L) | 41 | 0 | 0 |
| C | (mg/L) | 0 | 0 | 0 |
| P | (mg/L) | 19 | 0 | 0 |
| Na | (mg/L) | 0 | 0 | 0 |
| Ca | (mg/L) | 0 | 580 | 1 |
| F$^-$ | (mg/L) | 3,204 | 14 | 14 |
| SO$_4^{2-}$ | (mg/L) | 31,500 | 7,500 | 7,500 |
| CO$_3^{2-}$ | (mg/L) | 0 | 0 | 1,650 |

TABLE 13

Ref. Ex. 3

| Kind of leaching liquid | | Acid leaching liquid | Liquid obtained by neutralization | Liquid from which Ca was removed by solidification |
|---|---|---|---|---|
| Amount of leaching liquid | (L) | 400 | 220 | 210 |
| pH | (—) | 2.0 | 13.0 | 13.0 |
| Li | (mg/L) | 3,614 | 6,008 | 4,792 |
| Co | (mg/L) | 388 | 0 | 0 |
| Ni | (mg/L) | 388 | 0 | 0 |
| Mn | (mg/L) | 1,230 | 0 | 0 |
| Cu | (mg/L) | 0 | 0 | 0 |
| Al | (mg/L) | 2,030 | 0 | 0 |
| Fe | (mg/L) | 41 | 0 | 0 |
| C | (mg/L) | 0 | 0 | 0 |
| P | (mg/L) | 19 | 0 | 0 |
| Na | (mg/L) | 0 | 0 | 21,600 |
| Ca | (mg/L) | 0 | 2,320 | 1 |
| F$^-$ | (mg/L) | 3,204 | 56 | 56 |
| SO$_4^{2-}$ | (mg/L) | 31,500 | 30,000 | 30,000 |
| CO$_3^{2-}$ | (mg/L) | 0 | 0 | 27,000 |

TABLE 14

Ref. Ex. 4

| Kind of leaching liquid | | Acid leaching liquid | Liquid obtained by neutralization | Liquid from which Ca was removed by solidification |
|---|---|---|---|---|
| Amount of leaching liquid | (L) | 150 | 350 | 345 |
| pH | (—) | 2.0 | 12.8 | 12.8 |
| Li | (mg/L) | 5,141 | 1,807 | 1,796 |
| Co | (mg/L) | 1,833 | 0 | 0 |
| Ni | (mg/L) | 1,813 | 0 | 0 |
| Mn | (mg/L) | 5,612 | 0 | 0 |
| Cu | (mg/L) | 0 | 0 | 0 |
| Al | (mg/L) | 9,791 | 0 | 0 |
| Fe | (mg/L) | 202 | 0 | 0 |
| C | (mg/L) | 0 | 0 | 0 |
| P | (mg/L) | 1,010 | 0 | 0 |
| Na | (mg/L) | 0 | 0 | 5,400 |
| Ca | (mg/L) | 0 | 340 | 1 |
| F$^-$ | (mg/L) | 8,107 | 17 | 17 |
| SO$_4^{2-}$ | (mg/L) | 81,000 | 9,500 | 9,500 |
| CO$_3^{2-}$ | (mg/L) | 0 | 0 | 7,000 |

TABLE 15

| Distribution ratio after each step | Li leaching (%) | Neutralization (%) | Ca removal (solidification/ adsorption) (%) | Preparatory concentration (%) | Crystallization of Li carbonate | |
|---|---|---|---|---|---|---|
| | | | | | Crystallized product (first) (%) | Crystallized product (first + second) (%) |
| Ex. 1 | 66 | 61 | 60 | Not performed | 47 | 57 |
| Ex. 2 | 67 | Not measured | Not measured | Not performed | 45 | 57 |
| Ex. 3 | 53 | Not measured | Not measured | Not performed | 47 | 57 |
| Ex. 4 | 58 | 54 | 53 | Not performed | 41 | 50 |
| Ex. 5 | 66 | 61 | 60 | Not performed | 47 | 57 |
| Ex. 6 | 66 | 61 | 60 | 60 | 32 | 47 |
| Ex. 7 | 66 | 61 | 60 | 60 | 47 | 57 |
| Comp. Ex. 3 | 34 | 30 | 30 | Not performed | Not performed | Not performed |
| Ref. Ex. 1 | 66 | 61 | Not performed | Not performed | 48 | 57 |
| Ref. Ex. 2 | 66 | 61 | 60 | Not performed | 47 | 58 |
| Ref. Ex. 3 | 66 | 61 | 46 | Not performed | 34 | 43 |
| Ref. Ex. 4 | 35 | 29 | 28 | Not performed | 23 | 27 |

TABLE 16

| | | Grade in Li carbonate crystallized product | | | | | | | | | | |
|---|---|---|---|---|---|---|---|---|---|---|---|---|
| Element | Unit | Ex. 1 | Ex. 2 | Ex. 3 | Ex. 4 | Ex. 5 | Ex. 6 | Ex. 7 | Ref. Ex. 1 | Ref. Ex. 2 | Ref. Ex. 3 | Ref. Ex. 4 |
| $Li_2CO_3$ | (%) | 99.4 | 99.3 | 99.4 | 99.3 | 99.4 | 99.3 | 99.3 | 90.1 | 81.3 | 99.2 | 99.3 |
| Na | (ppm) | 810 | 950 | 650 | 810 | 913 | 1,225 | 1,235 | 1,030 | 0 | 1,200 | 980 |
| K | (ppm) | 0 | 0 | 0 | 0 | 0 | 0 | 0 | 0 | 0 | 0 | 0 |
| Ca | (ppm) | 98 | 102 | 67 | 109 | 0 | 0 | 0 | 91,800 | 73 | 98 | 87 |
| Fe | (ppm) | 0 | 0 | 0 | 0 | 0 | 0 | 0 | 0 | 0 | 0 | 0 |
| $SO_4$ | (ppm) | 1,485 | 1,520 | 1,230 | 1,505 | 1,610 | 2,160 | 2,240 | 2,040 | 171,736 | 1,950 | 1,875 |
| Cl | (ppm) | 0 | 0 | 0 | 0 | 0 | 0 | 0 | 0 | 0 | 0 | 0 |
| F | (ppm) | 200 | 300 | 100 | 200 | 100 | 100 | 200 | 0 | 8,500 | 200 | 200 |
| Ignition loss | (ppm) | 3,800 | 3,700 | 3,600 | 4,000 | 3,700 | 4,000 | 3,500 | 4,500 | 6,200 | 4,600 | 3,700 |

The Li carbonate recovery speed in the recovery process of Examples 1 to 7 is presented in Table 17.

TABLE 17

| Processing performance in step | Ex. 1 to 5 | Ex. 6 and 7 |
|---|---|---|
| Preparatory concentration | None | Electrodialysis |
| Recovery of Li carbonate | Evaporative concentration (normal pressure) | Addition of $CO_2$ (heating) |
| Li carbonate recovery performance | 0.1 kg/h | 0.6 kg/h |

From the results of Table 17, it was revealed that in Examples 6 and 7 in which preparatory concentration (that could concentrate lithium at a speed ten times higher than evaporative concentration in Example 1) was performed, it was possible to improve the lithium recovery speed to 6 times higher than in Examples 1 to 5.

In Example 1, it was possible to recover magnetically attractable materials having Co and Ni grades that were both 20% or higher, and the Co and Ni recovery rates in the magnetically attractable materials were 90% or higher as presented in Table 1 and Table 3.

In Example 1, it was possible to recover a carbon concentrate (acid leaching residue) having a C grade of 90% or higher, and the C recovery rate in the carbon concentrate was 80% or higher as presented in Table 2 and Table 3.

In Example 1, the recovered lithium carbonate crystallized product (first) had a $SO_4$ grade of lower than 0.35%, a F grade of lower than 500 ppm, and a sodium grade of lower than 0.2% as presented in Table 16, and it was possible to obtain high-quality lithium carbonate in which lithium carbonate accounted for 99.0% by mass or greater.

In Example 1, the recovery rate of lithium in lithium carbonate (first crystallization) when the amount of lithium in the fine-grained product was seen to be 100% was 47% as presented in Table 15. Dissolved lithium amounting to 13% on the same basis was present in the post-crystallization liquid obtained in this step, and impurities were concentrated in, for example, fluorine and sulfuric acid ions that were separated and recovered from Li carbonate. By subjecting this again to the processes from the neutralizing step to the lithium carbonate recovering step of Example 1, it was possible to improve the recovery rate of lithium into lithium carbonate (total of first crystallization and second crystallization) to 57%. The combined lithium carbonate of (first crystallization) and (second crystallization) was also able to achieve the quality of lithium carbonate (first crystallization), i.e., a $SO_4$ grade of lower than 0.35%, a fluorine grade of lower than 500 pp, and a sodium grade of lower than 0.2%.

Lithium carbonate (first crystallization) of Examples 1 to 5 was able to achieve a lower sulfuric acid grade than in Examples 6 and 7. This was because crystallization of lithium carbonate was performed in parallel with evaporative concentration. Therefore, the sulfuric acid ion concentration in the liquid when crystallization of lithium carbonate was started was low, and it was possible to suppress inclusion of sulfuric acid derived from the water content of lithium carbonate better than in Examples 6 and 7 in which lithium carbonate was crystallized after preparatory concentration.

In Example 2, it was possible to recover magnetically attractable materials having Co and Ni grades that were both 20% or higher, and the Co and Ni recovery rates in the magnetically attractable materials were 90% or higher as presented in Table 1 and Table 3.

In Example 2, it was possible to recover a carbon concentrate (acid leaching residue) having a C grade of 90% or higher, and the C recovery rate in the carbon concentrate was 80% or higher as presented in Table 2 and Table 3.

In Example 2, the $SO_4$ grade was lower than 0.35%, the F grade was lower than 500 ppm, and the sodium grade was lower than 0.2% as presented in Table 16, and it was possible to obtain high-quality lithium carbonate in which lithium carbonate accounted for 99.0% by mass or greater.

In Example 2, the recovery rate of lithium in lithium carbonate (first crystallization) when the amount of lithium in the fine-grained product was seen to be 100% was 45% as presented in Table 15. By performing the processes from the neutralizing step to the lithium carbonate recovering step of Example 2 again, it was possible to improve the recovery rate of lithium into lithium carbonate (total of first crystallization and second crystallization) to 57%. The combined lithium carbonate of (first crystallization) and (second crystallization) was also able to achieve the quality of lithium carbonate (first crystallization), i.e., a $SO_4$ grade of lower than 0.35%, a fluorine grade of lower than 500 pp, and a sodium grade of lower than 0.2%.

In Example 3, it was possible to recover magnetically attractable materials having Co and Ni grades that were both 20% or higher, and the Co and Ni recovery rates in the magnetically attractable materials were 90% or higher as presented in Table 1 and Table 3.

In Example 3, it was possible to recover a carbon concentrate (acid leaching residue) having a C grade of 90% or higher, and the C recovery rate in the carbon concentrate was 80% or higher as presented in Table 2 and Table 3.

In Example 3, the $SO_4$ grade was lower than 0.35%, the F grade was lower than 500 ppm, and the sodium grade was lower than 0.2% as presented in Table 16, and it was possible to obtain high-quality lithium carbonate in which lithium carbonate accounted for 99.0% by mass or greater.

In Example 3, the recovery rate of lithium in lithium carbonate (first crystallization) when the amount of lithium in the fine-grained product was seen to be 100% was 47% as presented in Table 15. By performing the processes from the neutralizing step to the lithium carbonate recovering step of Example 3 again, it was possible to improve the recovery rate of lithium into lithium carbonate (total of first crystallization and second crystallization) to 57%. The combined lithium carbonate of (first crystallization) and (second crystallization) was also able to achieve the quality of lithium carbonate (first crystallization), i.e., a $SO_4$ grade of lower than 0.35%, a fluorine grade of lower than 500 pp, and a sodium grade of lower than 0.2%.

In Example 4, it was possible to recover magnetically attractable materials having Co and Ni grades that were both 20% or higher, and the Co and Ni recovery rates in the magnetically attractable materials were 90% or higher as presented in Table 1 and Table 3.

In Example 4, it was possible to recover a carbon concentrate (acid leaching residue) having a C grade of 90% or higher, and the C recovery rate in the carbon concentrate was 80% or higher as presented in Table 2 and Table 3.

In Example 4, the recovered lithium carbonate crystallized product (first) had a $SO_4$ grade of lower than 0.35%, a F grade of lower than 500 ppm, and a sodium grade of lower than 0.2% as presented in Table 16, and it was possible to obtain high-quality lithium carbonate in which lithium carbonate accounted for 99.0% by mass or greater. Particularly, the Ca grade was 0 ppm (lower than the limit of quantification).

In Example 4, the recovery rate of lithium in lithium carbonate (first crystallization) when the amount of lithium in the fine-grained product was seen to be 100% was 41% as presented in Table 15. Dissolved lithium amounting to 12.0% on the same basis was present in the post-crystallization liquid obtained in this step. By subjecting this again to the processes from the neutralizing step to the lithium carbonate recovering step of Example 4, it was possible to improve the recovery rate of lithium into lithium carbonate (total of first crystallization and second crystallization) to 50%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification).

In Example 5, it was possible to recover magnetically attractable materials having Co and Ni grades that were both 20% or higher, and the Co and Ni recovery rates in the magnetically attractable materials were 90% or higher as presented in Table 1 and Table 3.

In Example 5, it was possible to recover a carbon concentrate (acid leaching residue) having a C grade of 90% or higher, and the C recovery rate in the carbon concentrate was 80% or higher as presented in Table 2 and Table 3.

In Example 5, the recovered lithium carbonate crystallized product (first) had a $SO_4$ grade of lower than 0.35%, a F grade of lower than 500 ppm, and a sodium grade of lower than 0.2% as presented in Table 16, and it was possible to obtain high-quality lithium carbonate in which lithium carbonate accounted for 99.0% by mass or greater. Particularly, the Ca grade was 0 ppm (lower than the limit of quantification).

In Example 5, the recovery rate of lithium in lithium carbonate (first crystallization) when the amount of lithium in the fine-grained product was seen to be 100% was 47% as presented in Table 15. Dissolved lithium amounting to 13% on the same basis was present in the post-crystallization liquid obtained in this step. By subjecting this again to the processes from the neutralizing step to the lithium carbonate recovering step of Example 5, it was possible to improve the recovery rate of lithium into lithium carbonate (total of first crystallization and second crystallization) to 57%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification).

In Example 6, it was possible to recover magnetically attractable materials having Co and Ni grades that were both 20% or higher, and the Co and Ni recovery rates in the magnetically attractable materials were 90% or higher as presented in Table 1 and Table 3.

In Example 6, it was possible to recover a carbon concentrate (acid leaching residue) having a C grade of 90% or higher, and the C recovery rate in the carbon concentrate was 80% or higher as presented in Table 2 and Table 3.

In Example 6, the recovered lithium carbonate crystallized product (first) had a $SO_4$ grade of lower than 0.35%, a F grade of lower than 500 ppm, and a sodium grade of lower than 0.2% as presented in Table 16, and it was possible to obtain high-quality lithium carbonate in which lithium carbonate accounted for 99.0% by mass or greater. Particularly, the Ca grade was 0 ppm (lower than the limit of quantification).

In Example 6, the recovery rate of lithium in lithium carbonate (first crystallization) when the amount of lithium in the fine-grained product was seen to be 100% was 32% as presented in Table 15. Dissolved lithium amounting to 28% on the same basis was present in the post-crystallization liquid obtained in this step. By subjecting this again to the processes from the neutralizing step to the lithium carbonate recovering step of Example 6, it was possible to improve the recovery rate of lithium into lithium carbonate (total of first crystallization and second crystallization) to 47%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification).

In Example 7, it was possible to recover magnetically attractable materials having Co and Ni grades that were both 20% or higher, and the Co and Ni recovery rates in the magnetically attractable materials were 90% or higher as presented in Table 1 and Table 3.

In Example 7, it was possible to recover a carbon concentrate (acid leaching residue) having a C grade of 90% or higher, and the C recovery rate in the carbon concentrate was 80% or higher as presented in Table 2 and Table 3.

In Example 7, the recovered lithium carbonate crystallized product (first) had a $SO_4$ grade of lower than 0.35%, a F grade of lower than 500 ppm, and a sodium grade of lower than 0.2% as presented in Table 16, and it was possible to obtain high-quality lithium carbonate in which lithium carbonate accounted for 99.0% by mass or greater. Particularly, the Ca grade was 0 ppm (lower than the limit of quantification).

In Example 7, the recovery rate of lithium in lithium carbonate (first crystallization) when the amount of lithium in the fine-grained product was seen to be 100% was 47% as presented in Table 16. Dissolved lithium amounting to 13% on the same basis was present in the post-crystallization liquid obtained in this step. By subjecting this again to the processes from the neutralizing step to the lithium carbonate recovering step of Example 7, it was possible to improve the recovery rate of lithium into lithium carbonate (total of first crystallization and second crystallization) to 57%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification).

In Comparative Example 1, Co and Ni concentrates (magnetically attractable materials) were not obtained as presented in Table 2, because the wet magnetic sorting step was not performed. The C grade in the leaching residue was merely 70%, and it was impossible to obtain a high-quality carbon concentrate.

In Comparative Example 2, the C grade in the filtration residue was merely 73% and it was impossible to obtain a high-quality carbon concentrate as presented in Table 2 and Tables 4 and 5. Moreover, because the acid leaching step was not performed, what could be leached was only water-soluble lithium, and the recovery rate of lithium into the leaching liquid was merely 23%.

In Comparative Example 3, as can be seen from the results presented in Tables 2, and 4 and 5, and Table 15, the C grade in the acid leaching reside was merely 79% and it was impossible to obtain a high-quality carbon concentrate, and because pH was high, the recovery rate of lithium into the leaching liquid was merely 34% and it was impossible to leach lithium by a sufficient amount.

In Reference Example 1, because the calcium solidification removing step was not performed, the Ca grade in recovered lithium carbonate was higher than 9% as presented in Table 11 and it was impossible to recover high-quality lithium carbonate. On the other hand, the Co and Ni recovery rates in the magnetically attractable materials were 90% or higher.

In Reference Example 1, it was possible to recover a carbon concentrate (acid leaching residue) having a C grade of 90% or higher, and the C recovery rate in the carbon concentrate was 80% or higher as presented in Table 2 and Table 3.

In Reference Example 2, as presented in Table 12, the amount of $CO_3^{2-}$ that could be kept dissolved was merely 1,650 mg/L (if the $CO_2$ gas was supplied more than this, pH would decrease to a pH range in which $CO_3^{2-}$ could not be kept dissolved).

In Reference Example 2, as presented in Table 12, $CO_3^{2-}$ for forming lithium carbonate was insufficient, and a lithium crystallized product containing a large quantity of impurities was obtained as indicated by a $SO_4$ grade of 17% and a F grade of 8,500 ppm. On the other hand, the Co and Ni recovery rates in the magnetically attractable materials were 90% or higher.

In Reference Example 2, it was possible to recover a carbon concentrate (acid leaching residue) having a C grade of 90% or higher, and the C recovery rate in the carbon concentrate was 80% or higher as presented in Table 2 and Table 3.

In Reference Example 3, when the amount of lithium contained in the fine-grained product was seen to be 100%, lithium amounting to 15% thereof was lost during Ca solidification removing as presented in Table 13 (the lithium concentration was high and lithium carbonate precipitated when carbonate ions were supplied). However, as presented in Table 13, the recovered lithium carbonate crystallized product (first) had a $SO_4$ grade of lower than 0.35%, a F grade of lower than 500 ppm, and a sodium grade of lower than 0.2%, and it was possible to obtain high-quality lithium carbonate in which lithium carbonate accounted for 99.0% by mass or greater.

In Reference Example 3, the recovery rate of lithium in lithium carbonate (first crystallization) when the amount of lithium in the fine-grained product was seen to be 100% was 34% as presented in Table 16. Dissolved lithium amounting to 11% on the same basis was present in the post-crystallization liquid obtained in this step. By subjecting this again to the processes from the neutralizing step to the lithium carbonate recovering step of Reference Example 3, it was possible to improve the recovery rate of lithium into lithium carbonate (total of first crystallization and second crystallization) to 43%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification). The Co and Ni recovery rates in the magnetically attractable materials were 90% or higher.

In Reference Example 3, it was possible to recover a carbon concentrate (acid leaching residue) having a C grade of 90% or higher, and the C recovery rate in the carbon concentrate was 80% or higher as presented in Table 2 and Table 3.

In Reference Example 4, as presented in Table 14, the sulfuric acid ion concentration and the lithium ion concentration in the Li-leached liquid were high, and when the amount of lithium contained in the fine-grained product was seen to be 100%, lithium amounting to 6% thereof was lost into a neutralization cake. However, as presented in Table 14, the recovered lithium carbonate crystallized product (first) had a $SO_4$ grade of lower than 0.35%, a F grade of lower than 500 ppm, and a sodium grade of lower than 0.2%, and it was possible to obtain high-quality lithium carbonate in which lithium carbonate accounted for 99.0% by mass or greater.

In Reference Example 4, the recovery rate of lithium in lithium carbonate (first crystallization) when the amount of lithium in the fine-grained product was seen to be 100% was 23% as presented in Table 16. Dissolved lithium amounting to 5% on the same basis was present in the post-crystallization liquid obtained in this step. By subjecting this again to the processes from the neutralizing step to the lithium carbonate recovering step of Reference Example 4, it was possible to improve the recovery rate of lithium into lithium carbonate (total of first crystallization and second crystallization) to 27%. The combined lithium carbonate of (first crystallization) and (second crystallization) was also able to achieve the quality of lithium carbonate (first crystallization), i.e., a $SO_4$ grade of lower than 0.35%, a F grade of lower than 500 pp, a Na grade of lower than 0.2%, and a Ca grade of 0 ppm (lower than the limit of quantification). Moreover, by also subjecting the water leaching liquid to the neutralizing step, the Ca removing step, and the Li carbonate crystallizing step to thereby recover Li carbonate, it was possible to better improve the Li carbonate recovery rate. The Co and Ni recovery rates in the magnetically attractable materials were 90% or higher.

In Reference Example 4, it was possible to recover a carbon concentrate (acid leaching residue) having a C grade of 90% or higher, and the C recovery rate in the carbon concentrate was 80% or higher as presented in Table 2 and Table 3.

The invention claimed is:

1. A method for recovering a valuable substance from a lithium ion secondary battery, the method comprising:

thermally treating a lithium ion secondary battery at a temperature of 750° C. or higher and 800° C. or lower, to obtain a thermally treated product;

classifying a pulverized product that is obtained by pulverizing the thermally treated product, to obtain a coarse-grained product and a fine-grained product both containing the valuable substance;

performing water leaching of immersing the fine-grained product in water, to obtain a water-leached slurry;

performing wet magnetic sorting of the water-leached slurry, to sort the water-leached slurry into magnetically attractable materials and a slurry of non-magnetically attractable materials; and performing acid leaching by:

forming an acidified material by adding an acidic solution to the slurry of the non-magnetically attractable materials recovered by the wet magnetic sorting, forming an acidified material by adding an acidic solution to non-magnetically attractable materials obtained by solid-liquid separation of the slurry of the non-magnetically attractable materials, forming an acidified material by adding an acidic solution to both:

the slurry of the non-magnetically attractable materials recovered by the wet magnetic sorting, and non-magnetically attractable materials obtained by solid-liquid separation of the slurry of the non-magnetically attractable materials, the acidic solution being added in an amount effective to adjust pH to 0 or higher and 3.5 or lower and leach the non-magnetically attractable materials, and subsequently performing solid-liquid separation of the acidified material to obtain an acid leaching liquid and an acid leaching residue; wherein of the valuable substance, one or more selected from the group consisting of cobalt, nickel, and manganese integrated with cobalt are recovered as the magnetically attractable materials in the wet magnetic sorting.

2. The method for recovering a valuable substance according to claim 1, wherein the acid leaching residue obtained in the acid leaching is a carbon (C) concentrate having a carbon (C) grade of 80% or higher.

3. The method for recovering a valuable substance according to claim 1, wherein a cobalt (Co) grade in the magnetically attractable materials recovered in the wet magnetic sorting is higher than 10%, and a recovery rate of cobalt (Co) into the magnetically attractable materials is 50% or higher.

4. The method for recovering a valuable substance according to claim 1, comprising neutralizing the acid leaching liquid with an alkali.

5. The method for recovering a valuable substance according to claim 1, comprising after the wet magnetic sorting, performing solid-liquid separation of the slurry of the non-magnetically attractable materials into a filtrate and a filtration residue, wherein the method comprises neutralizing a mixture liquid, in which the filtrate obtained in the solid-liquid separation and the acid leaching liquid obtained in the acid leaching are mixed, with an alkali.

6. The method for recovering a valuable substance according to claim 4, wherein the alkali contains a calcium compound.

7. The method for recovering a valuable substance according to claim 4, wherein the alkali contains calcium hydroxide.

8. The method for recovering a valuable substance according to claim 4, wherein the acidic solution used in the acid leaching is sulfuric acid, and in the neutralizing, the acid leaching liquid or the mixture liquid is neutralized until an amount of sulfuric acid ions in a liquid obtained by neutralization becomes 10.0 g/L or less.

9. The method for recovering a valuable substance according to claim 1, wherein a sulfuric acid ion concentration in the acid leaching liquid obtained in the acid leaching is 50,000 mg/L or lower.

10. The method for recovering a valuable substance according to claim 4, comprising performing calcium solidification removing of solidifying calcium ions in a liquid obtained by solid-liquid separation of a slurry obtained in the neutralizing, to separate the calcium ions from the liquid.

11. The method for recovering a valuable substance according to claim 10, wherein the calcium solidification removing is performed by adding a substance containing carbon dioxide.

12. The method for recovering a valuable substance according to claim 11, wherein the substance containing carbon dioxide is a carbonate of an alkali metal.

13. The method for recovering a valuable substance according to claim 10, wherein a liquid temperature of the liquid that is a target of the calcium solidification removing is 40° C. or lower, and a lithium concentration in the liquid is lower than 5,000 mg/L.

14. The method for recovering a valuable substance according to claim 4, wherein ion adsorption removing using either or both of an anion exchange resin and a cation exchange resin is performed after the neutralizing.

15. The method for recovering a valuable substance according to claim 10, wherein calcium adsorption removing using a cation exchange resin is performed after the neutralizing or the calcium solidification removing.

16. The method for recovering a valuable substance according to claim 15, wherein before the calcium adsorption removing or after the calcium adsorption removing, a liquid from which cations have been removed by adsorption is subjected to preparatory concentration by electrodialysis.

17. The method for recovering a valuable substance according to claim 16, wherein a substance containing carbon dioxide is supplied to a liquid obtained by the preparatory concentration to crystallize lithium carbonate, and solid-liquid separation is performed subsequently to obtain lithium carbonate and a post-crystallization liquid.

18. The method for recovering a valuable substance according to claim 15, wherein the liquid from which calcium has been removed by solidification or the liquid from which calcium has been removed by adsorption is heated to decrease solubility of lithium carbonate, and solid-liquid separation is performed subsequently to recover lithium carbonate and a post-crystallization liquid.

19. The method for recovering a valuable substance according to claim 17, wherein the post-crystallization liquid is repeatedly subjected to neutralizing, to ultimately crystallize lithium carbonate derived from the post-crystallization liquid.

* * * * *